US012595089B2

(12) United States Patent
Nishimoto

(10) Patent No.: US 12,595,089 B2
(45) Date of Patent: Apr. 7, 2026

(54) PEELING AND STICKING METHOD AND PROGRAM

(71) Applicant: FUJI CORPORATION, Chiryu (JP)

(72) Inventor: Takeshi Nishimoto, Fuso-cho (JP)

(73) Assignee: FUJI CORPORATION, Chiryu (JP)

( * ) Notice: Subject to any disclaimer, the term of this patent is extended or adjusted under 35 U.S.C. 154(b) by 111 days.

(21) Appl. No.: 18/292,028

(22) PCT Filed: Aug. 5, 2021

(86) PCT No.: PCT/JP2021/029058
§ 371 (c)(1),
(2) Date: Jan. 25, 2024

(87) PCT Pub. No.: WO2023/012962
PCT Pub. Date: Feb. 9, 2023

(65) Prior Publication Data
US 2025/0091753 A1    Mar. 20, 2025

(51) Int. Cl.
*B65C 9/36*    (2006.01)
*B25J 11/00*    (2006.01)
*B65C 9/00*    (2006.01)

(52) U.S. Cl.
CPC ............... *B65C 9/36* (2013.01); *B25J 11/005* (2013.01); *B65C 9/0006* (2013.01)

(58) Field of Classification Search
CPC .... B25J 11/005; B65C 9/0006; B65C 9/1884; B65C 9/26; B65C 9/36
See application file for complete search history.

(56) References Cited

FOREIGN PATENT DOCUMENTS

| | | |
|---|---|---|
| CN | 112298726 A | 2/2021 |
| FR | 3 028 790 A1 | 5/2016 |
| JP | 2002-274516 A | 9/2002 |
| JP | 2013-014337 A | 1/2013 |
| JP | 2014-181089 A | 9/2014 |
| JP | 2018-015846 A | 2/2018 |

OTHER PUBLICATIONS

Translation of description of JP2014181089.*
Translation of WO2023012962.*
International Search Report issued Sep. 28, 2021 in PCT/JP2021/029058, filed on Aug. 5, 2021, 3 pages.

* cited by examiner

*Primary Examiner* — Sonya M Sengupta
(74) *Attorney, Agent, or Firm* — Oblon, McClelland, Maier & Neustadt, L.L.P.

(57) ABSTRACT

A peeling and sticking method is executed by a peeling and sticking device including a collection member configured to collect a sticker and a peeling member configured to peel the sticker, and the sticker is peeled from a sheet to which one or more stickers are stuck. This method includes an applying step of applying a force to the sticker in an inclination direction inclined with respect to a vertical direction of a surface of the sticker by causing the collection member configured to collect the sticker to abut on the surface of the sticker, an inserting step of inserting the peeling member between the sticker and the sheet in an end portion of the sticker on a side opposite to the inclination direction to peel the sticker, and a moving step of moving the peeled sticker.

11 Claims, 16 Drawing Sheets

Fig. 10

```
        ┌─────────────────────────────────────┐
        │      CLEANING PROCESS ROUTINE       │
        └─────────────────────────────────────┘
                          │
        ┌─────────────────▼─────────────────┐
   NO   ╱          CLEANING TIMING?          ╲──── S300
  ┌─────┤                                   ╱
  │     └─────────────────┬─────────────────┘
  │                      YES
  │     ┌─────────────────────────────────────┐
  │     │ EXECUTE CLEANING PROCESS OF COLLECTION│──── S310
  │     │       SECTION/PEELING SECTION        │
  │     └─────────────────┬─────────────────┘
  │                        │
  │     ┌─────────────────▼─────────────────┐
   NO   ╱  ARE PEELING AND STICKING PROCESSES ╲──── S320
  └─────┤    OF ALL STICKERS COMPLETED?     ╱
        └─────────────────┬─────────────────┘
                         YES
        ┌─────────────────▼─────────────────┐
        │                END                 │
        └─────────────────────────────────────┘
```

Fig. 11

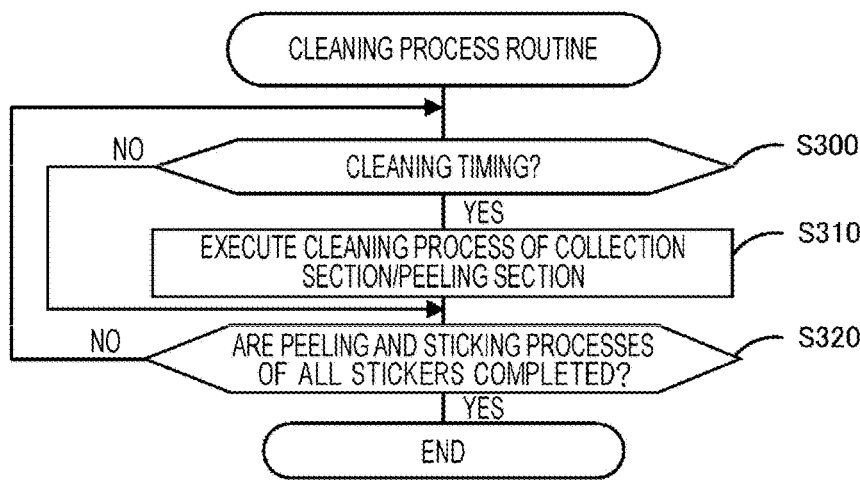

Fig. 12

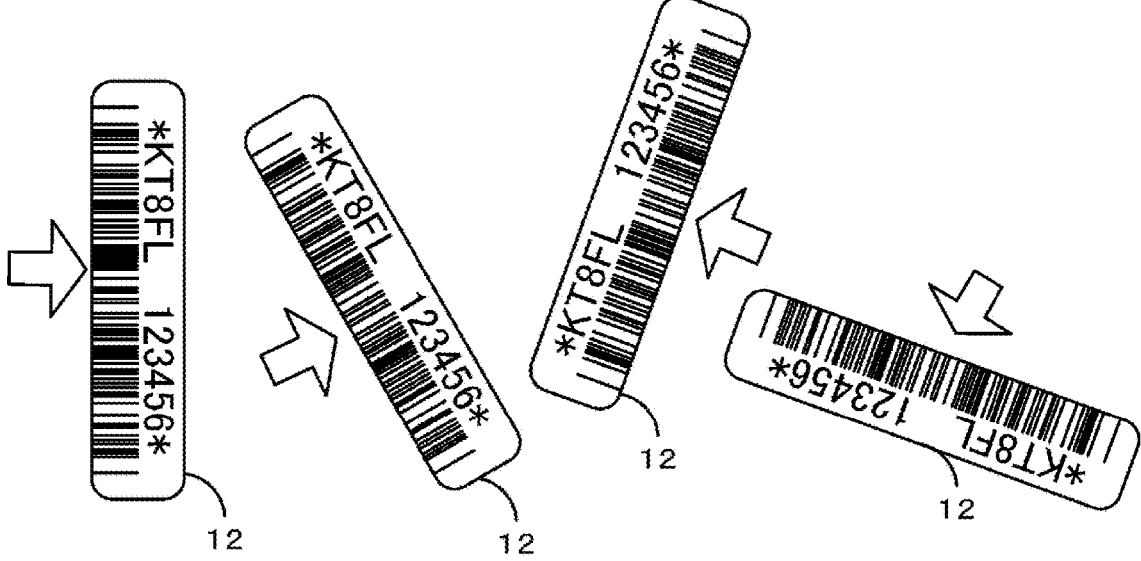

| | MOVEMENT AMOUNT: VALUE IN PARENTHESIS IS ABSOLUTE AMOUNT | | | |
|---|---|---|---|---|
| No. | S1 | S2 | S3 | S4 |
| X | 0 | 7.8(7.8) | 1(8.8) | 2.5(11.3) |
| Z | −0.5 | −0.5(−1.0) | −1.5(−2.5) | 0(−2.5) |

COLLECTION START          STICKER PEELING          FIXED REVOLVING POSTURE

PEELING AND STICKING METHOD AND PROGRAM

TECHNICAL FIELD

The present description discloses a peeling and sticking method and a program.

BACKGROUND ART

Conventionally, as a sticker attachment device, for example, a device is proposed in which a sticker is released from a mount by a first hand and a second hand, a held sticker is moved to an imaging position, and an outer shape of the sticker in a captured image is matched with an ideal sticker shape to cancel deformation of the sticker (for example, Patent Literature 1). In this device, a flexible sticker can be released from the mount by a robot hand, and the released sticker can be attached at a desired attachment position.

PATENT LITERATURE

Patent Literature 1: JP-A-2018-15846

BRIEF SUMMARY

Technical Problem

However, in the above-described sticker attachment device, the first hand and the second hand need to be separately controlled, and labor is required for position control or control for a peeling process, a moving process, and a sticking process of the sticker. As described above, there has been a demand for a device capable of reliably peeling, moving, and sticking a sticker stuck to a sheet by simplifying the processes.

The present disclosure has been made in view of such a problem, and a main object of the present disclosure is to provide a peeling and sticking method and a program capable of more reliably peeling a sticker from a sheet by a relatively simple process.

Solution to Problem

A peeling and sticking method and a program disclosed in the present description employ the following means in order to achieve the main object described above.

According to an aspect of the present disclosure, there is provided a peeling and sticking method executed by a peeling and sticking device including a collection member configured to collect a sticker and a peeling member configured to peel the sticker, the peeling and sticking device peeling the sticker from a sheet to which one or more stickers are stuck, the peeling and sticking method including:

an applying step of applying a force to the sticker in an inclination direction inclined with respect to a vertical direction of a surface of the sticker by causing the collection member configured to collect the sticker to abut on the surface of the sticker;

an inserting step of inserting the peeling member between the sticker and the sheet in an end portion of the sticker on a side opposite to the inclination direction to peel the sticker; and a moving step of moving the peeled sticker.

In this peeling and sticking method, the collection member abuts on the surface of the sticker to be inclined, and in a state where a force is applied to the sticker in the inclination direction, the peeling member can be inserted between the sheet and the sticker end portion to peel the sticker. As described above, in the peeling and sticking method, the sticker can be more reliably peeled and moved from the sheet by a relatively simple process of applying a force to the sticker in the inclination direction by the collection member to insert the peeling member into the end portion.

BRIEF DESCRIPTION OF DRAWINGS

FIG. 10 is a flowchart illustrating an example of a cleaning process routine.

FIG. 11 is a diagram of an example of detecting the direction of sticker 12.

FIG. 12 is a diagram of the position of end effector 20 in a peeling process of sticker 12.

FIG. 14 is a conceptual diagram of a series of processes of peeling sticker 12.

DESCRIPTION OF EMBODIMENTS

Figure 1:
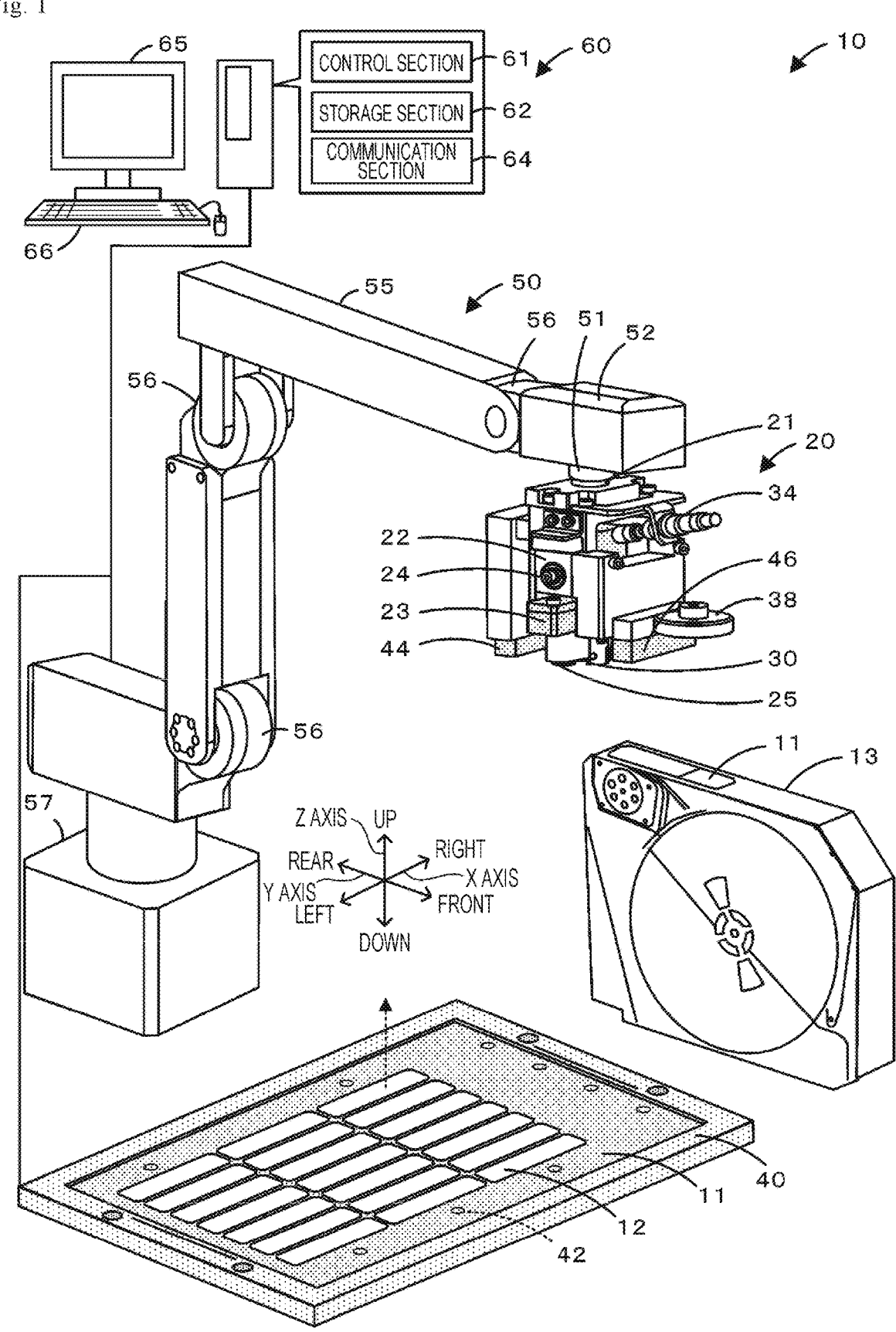
FIG. 1 is a schematic view illustrating an example of peeling and sticking device 10.
Figure 2:
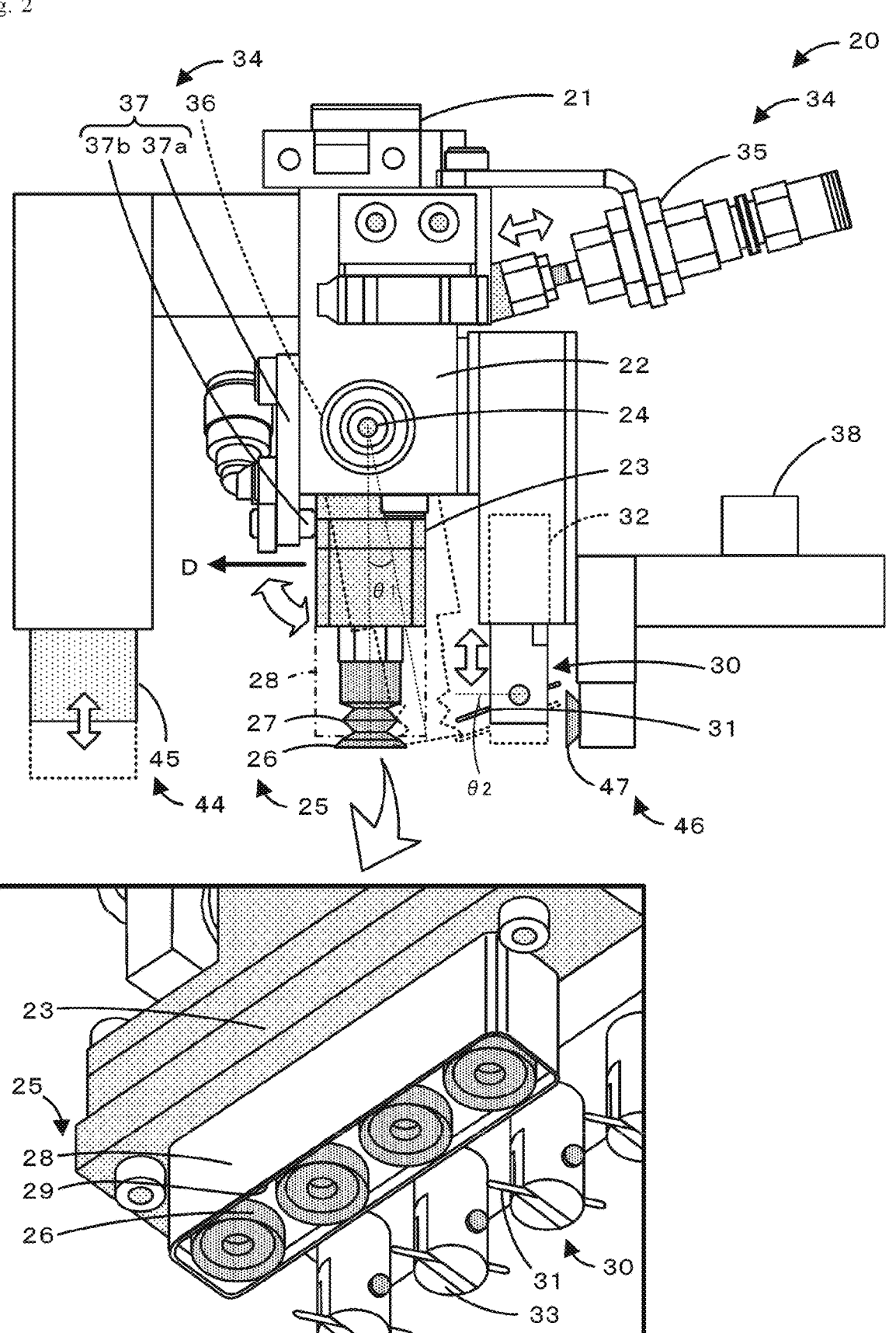
FIG. 2 is a side view and a perspective view from below of end effector 20.
Figure 3:
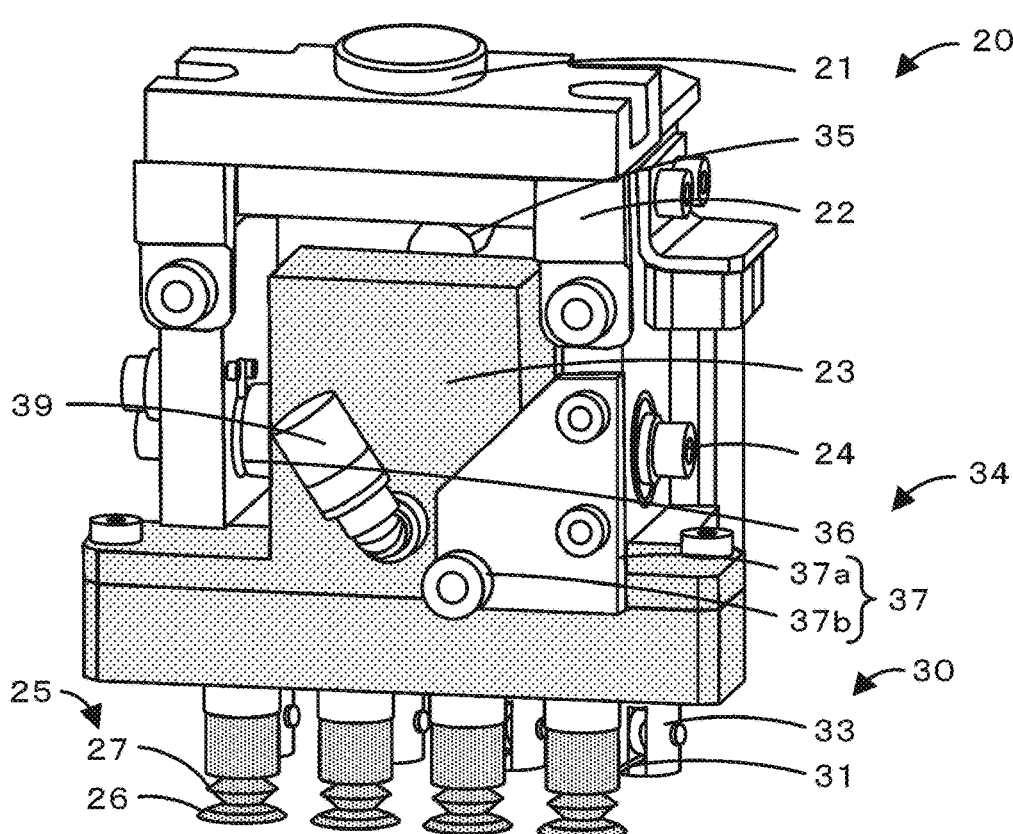
FIG. 3 is a perspective view of end effector 20.
Figure 4:
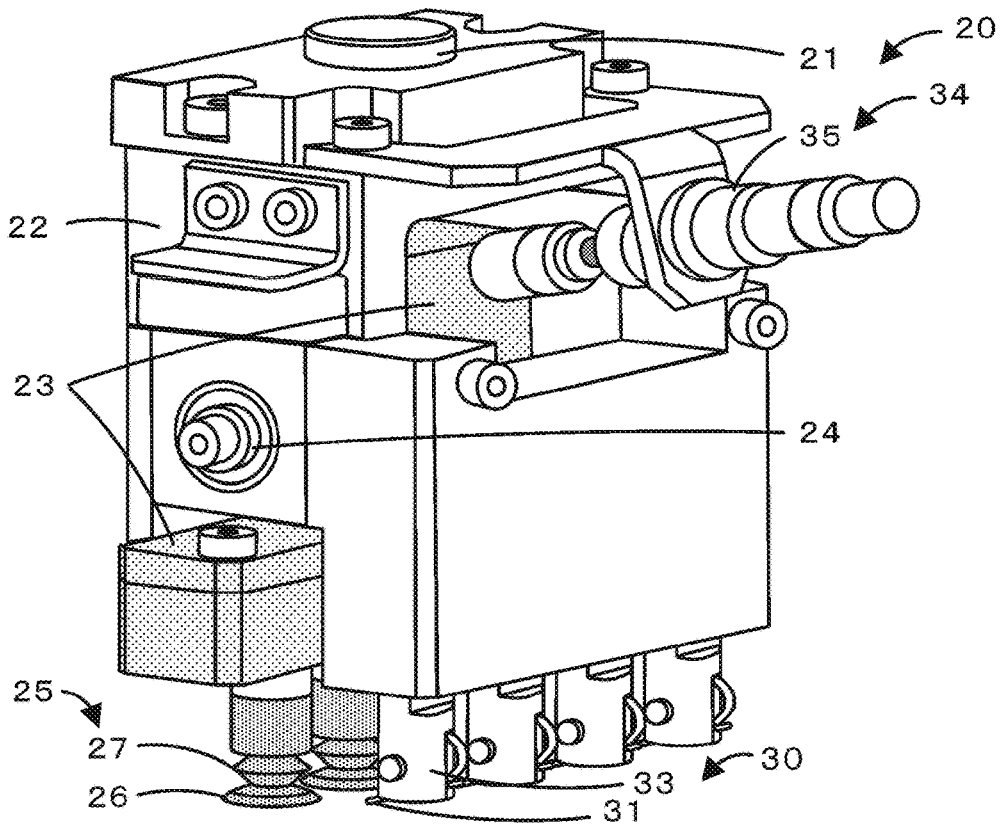
FIG. 4 is a perspective view of end effector 20.
Figure 5A:
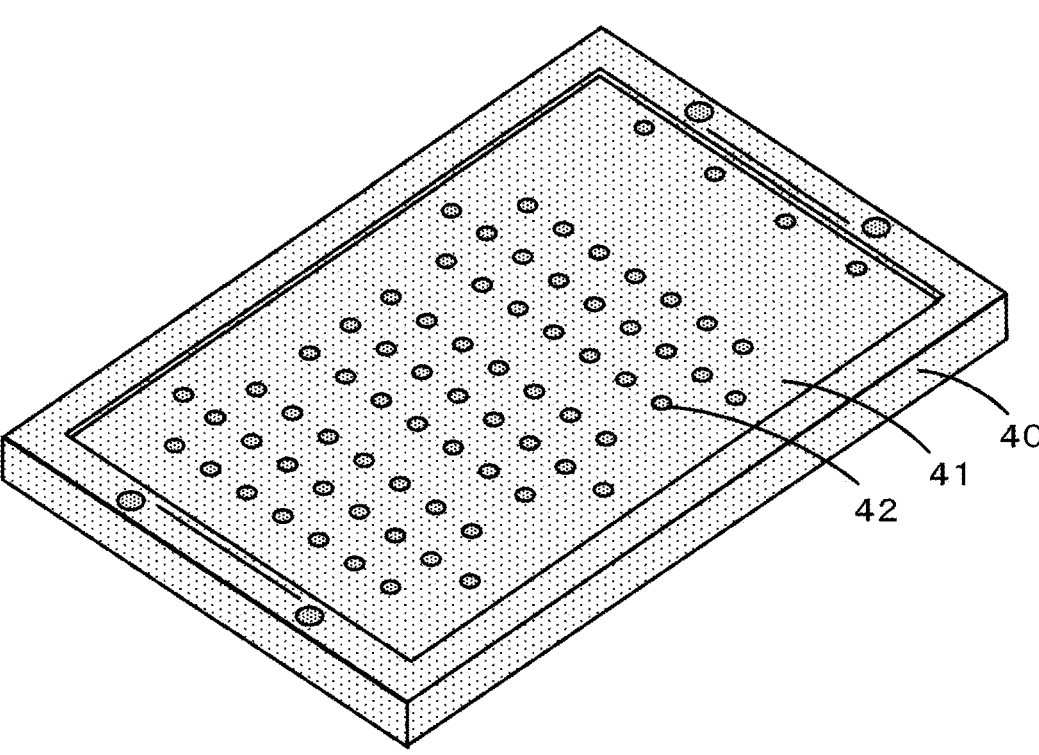
FIG. 5 is a perspective view of sheet holding section 40.
Figure 5B:
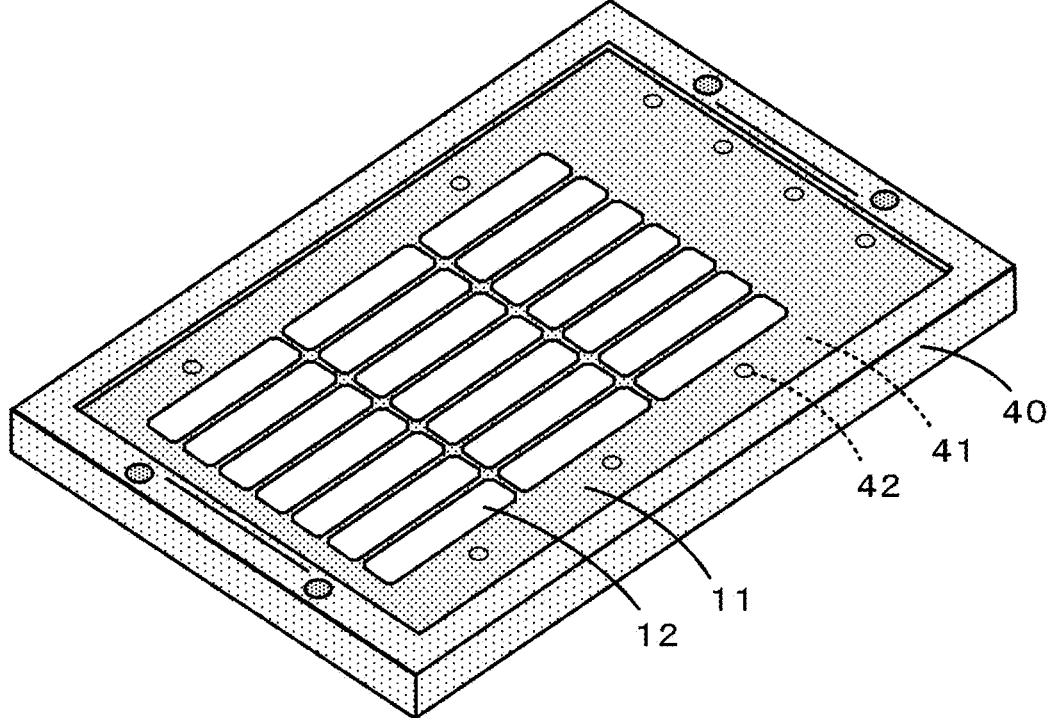
Figure 6:
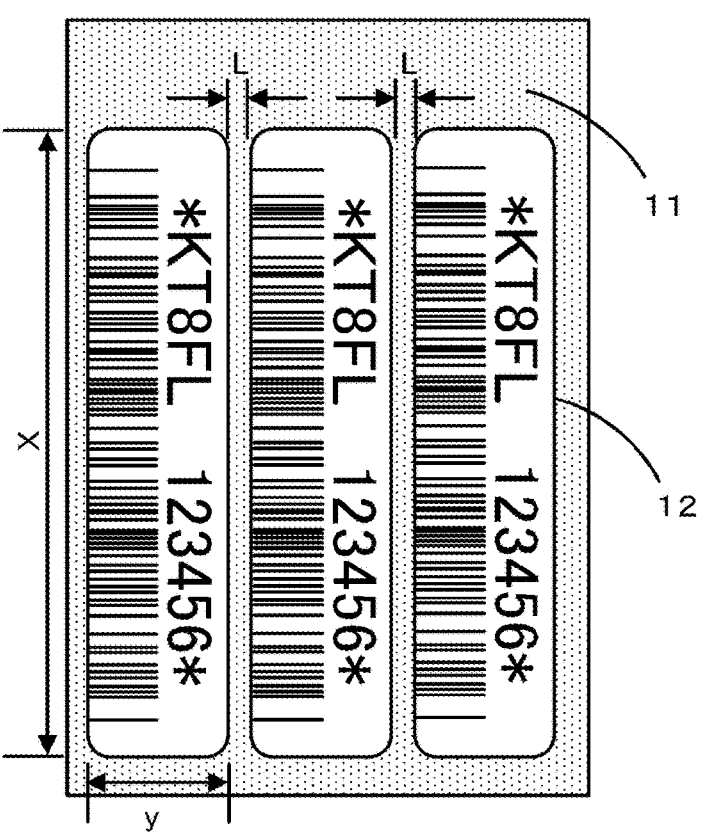
FIG. 6 is a view of sheet 11 and sticker 12.
Figure 7:
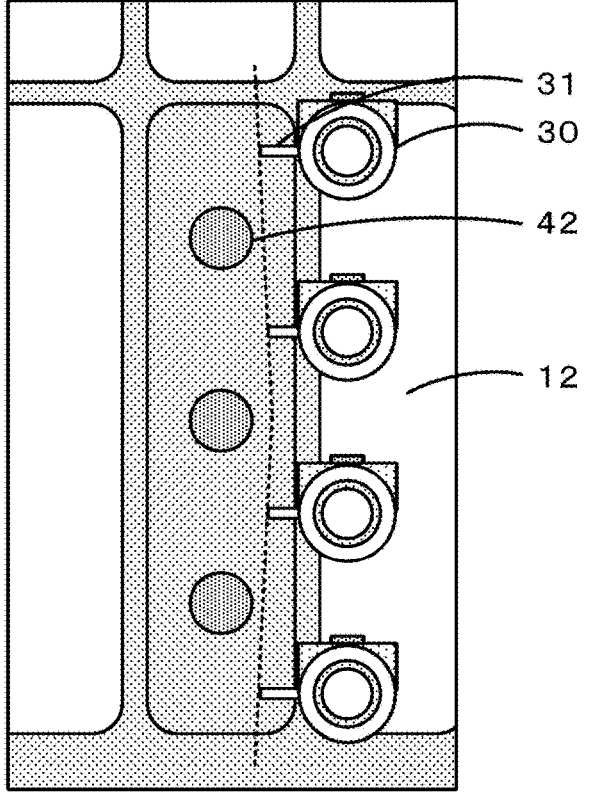
FIG. 7 is a view relating to a positional relationship between sticker 12 and peeling section 30.
Figure 8:
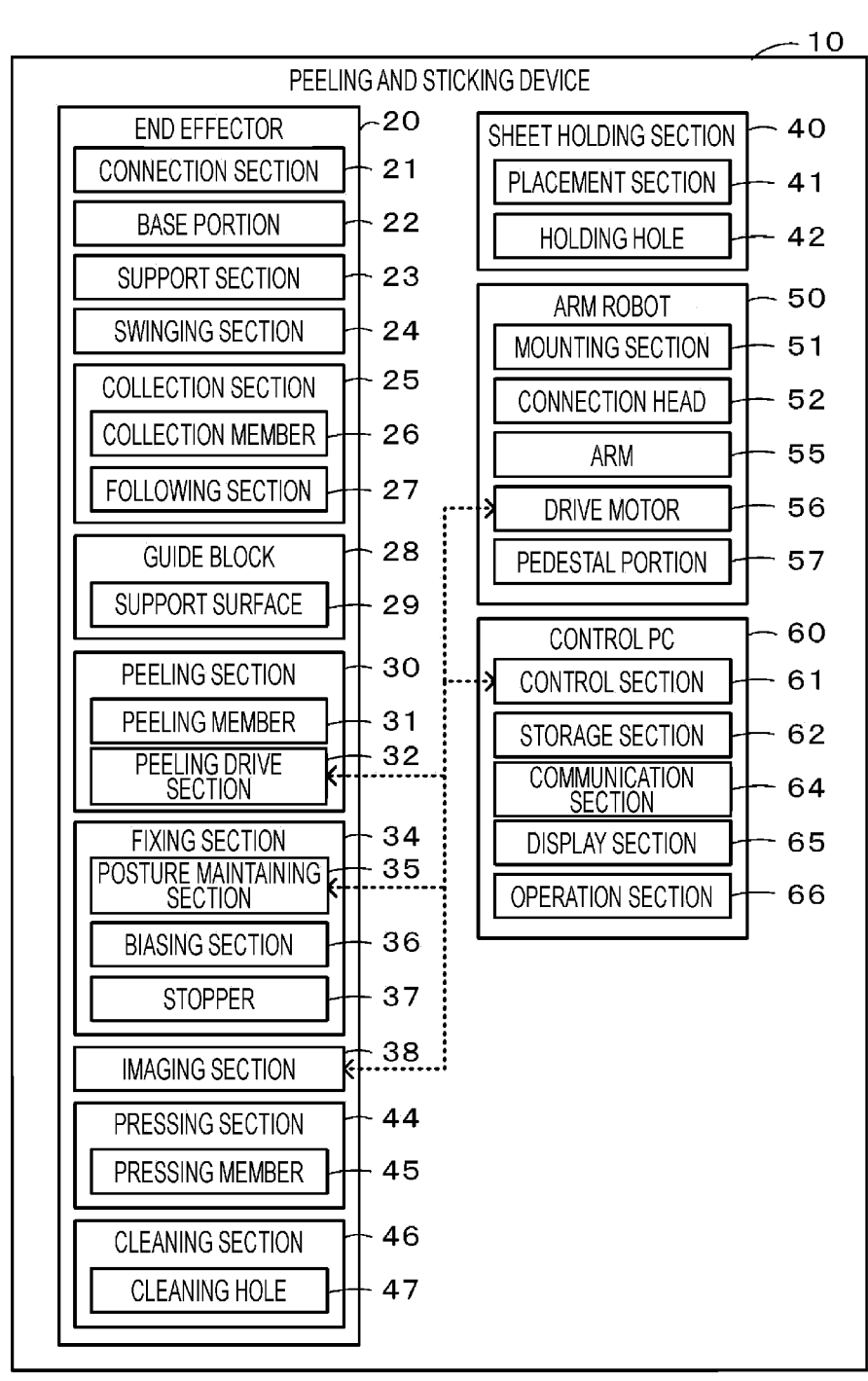
FIG. 8 is a block diagram illustrating an electrical connection relationship of peeling and sticking device 10.

Hereinafter, the present embodiment of the present disclosure will be described with reference to drawings. FIG. 1 is a schematic view illustrating an example of peeling and sticking device 10. FIG. 2 is a side view and a perspective view from below of end effector 20. FIG. 3 is a perspective view of end effector 20. FIG. 4 is a perspective view of end effector 20. FIG. 5 is a perspective view of sheet holding section 40, in which FIG. 5A illustrates a state in which sheet 11 is not present and FIG. 5B illustrates a state in which sheet 11 is held. FIG. 6 is a view of sheet 11 and sticker 12. FIG. 7 is a view relating to a positional relationship between sticker 12 and peeling section 30. FIG. 8 is a block diagram illustrating an electrical connection relationship of peeling and sticking device 10. Peeling and sticking device 10 is, for example, a system configured to execute processes of peeling and moving one or more stickers 12 attached to sheet 11 one by one and sticking sticker 12 to sticking target 13. Peeling and sticking device 10 includes peeling and sticking device 15, end effector 20, sheet holding section 40, arm robot 50, mounting section 51, and control PC 60. In the present embodiment, it is assumed that a left-right direction (X axis), a front-rear direction (Y axis), and an up-down direction (Z axis) are as illustrated in FIG. 1. In FIG. 2 and the subsequent drawings, for the sake of convenience in viewing the configuration, for example, the configurations of guide block 28, pressing section 44, cleaning section 46, and the like may be partially omitted.

For example, sticker 12 may be one in which information relating to sticking target 13 is formed (refer to FIG. 6). Examples of the information relating to sticking target 13 include identification information, the price of sticking target 13, performance, or the like. In addition, the information formed on sticker 12 may be, for example, a character, a symbol, a figure, or the like, or may be a barcode, a two-dimensional code, or the like. Sticking target 13 is not particularly limited as long as sticker 12 is stuck, and examples thereof include an industrial article including a machine, a device, a unit of a device, a component, or the like, and a daily necessity article, a food, a perishable article, or the like generally used. FIG. 1 illustrates a feeder which is used in a mounting device for mounting a component on a board and on which a tape holding the component is mounted, as an example of sticking target 13. As illustrated in FIG. 1, multiple stickers 12 are arranged and stuck to sheet 11. For example, as illustrated in FIG. 6, sticker 12 has length X in a long side direction and width Y in a short side direction, and is stuck to sheet 11 at interval L. As illustrated in FIG. 6, a code display field in which a code is displayed and a character display field in which characters related to the code are displayed may be formed in sticker 12.

End effector 20 is a device that is mounted on mounting section 51 of peeling and sticking device 10 that peels and moves sticker 12 from sheet 11 to which one or more stickers 12 are stuck. End effector 20 is a main part of peeling and sticking device 10 that moves sticker 12, and is mounted on connection head 52 disposed at a distal end of arm robot 50 in a detachable state. End effector 20 includes connection section 21, base portion 22, support section 23, swinging section 24, collection section 25, following section 27, guide block 28, peeling section 30, peeling drive section 32, posture maintaining section 35, fixing section 34, and imaging section 38. End effector 20 includes pressing section 44 and cleaning section 46.

Connection section 21 is an attachment that is connected to mounting section 51 and that fixes end effector 20 to arm robot 50. Connection section 21 may include, for example, a lock mechanism such as a pin and a groove into which the pin is inserted, and a fixing mechanism that fixes connection section 21 and mounting section 51 by magnetic force, negative pressure, or the like.

Base portion 22 is a main body member in which a configuration that realizes the function of peeling and sticking device 10 is disposed. As illustrated in FIG. 2, connection section 21 mounted on arm robot 50 is disposed above base portion 22, collection section 25 for collecting sticker 12 is disposed on a lower surface side of base portion 22 via support section 23, peeling section 30, imaging section 38, and cleaning section 46 are disposed on one side surface, and pressing section 44 is disposed on the opposite side surface. As illustrated in FIG. 3, base portion 22 has an inverted U-shape, and support section 23 is pivotally supported in a central space of base portion 22 in a swingable manner. Base portion 22 is freely moved in the up-down direction, the left-right direction, and the front-rear direction by arm robot 50.

Support section 23 is a member that supports collection section 25 and can incline collection section 25 with respect to a vertical direction of sticker 12. Support section 23 has an inverted T shape, a pressure applying device (not illustrated) is connected to support section 23 via supply pipe 39, and a negative pressure and a positive pressure are supplied to support section 23 from the pressure applying device. Examples of the pressure applying device include a vacuum pump and an air compressor. Swinging section 24 is fixed to base portion 22, pivotally supports support section 23, and swings support section 23 with respect to base portion 22. In support section 23, a lower end side where collection section 25, which is a free end, is disposed rotates (swings) within a predetermined range around a support shaft of pivotally supported swinging section 24. Since support section 23 is inclined, collection member 26 for collecting sticker 12 abuts on the surface of sticker 12 to apply a force to the sticker in inclination direction D inclined with respect to the vertical direction of the surface. Inclination direction D of support section 23 may be, for example, a direction orthogonal to the long side direction of sticker 12, that is, a direction along the short side direction. Inclination angle $\theta 1$ of support section 23 is, for example, in a range in which collection member 26 does not come off from abutting sticker 12, and is preferably in a range of 10° or more and 45° or less with respect to the vertical direction with reference to the vertical direction. Inclination angle $\theta 1$ of support section 23 is preferably 12.5° or more, more preferably 15° or more, and may be 17.5° or more or 20° or more. When inclination angle $\theta 1$ is larger, the force applied in the peeling direction of sticker 12 can be increased, which is preferable from the viewpoint of easy peeling. Inclination angle $\theta 1$ is preferably 40° or less, more preferably 35° or less, and may be 30° or less or 25° or less. When inclination angle $\theta 1$ is smaller, collection member 26 is less likely to be detached from sticker 12, which is preferable from the viewpoint of enhancing reliability.

Collection section 25 abuts on the surface of sticker 12 to collect sticker 12, and is disposed on the lower surface side of support section 23. Collection section 25 includes collection member 26 that collects sticker 12, following section 27 that causes collection member 26 to follow sticker 12 in accordance with the swinging of support section 23, and guide block 28 that supports collected sticker 12 (refer to FIG. 2). A negative pressure or a positive pressure is supplied to collection member 26 from a pressure applying device (not illustrated) via the inside of support section 23 and supply pipe 39. Collection member 26 is not particularly limited, but is a member that abuts on sticker 12 to apply a negative pressure and/or a positive pressure, and may be a pickup pad formed of a material having flexibility such as rubber or resin into a more circular sucker shape. In collection section 25, for example, pickup pads as multiple collection members 26 may be arranged along the long side direction of sticker 12. Following section 27 serves as a joint that causes collection section 25 to follow the surface of sticker 12 when support section 23 is inclined. In collection member 26, a pickup pad having flexibility also serves as following section 27 between the connection section to support section 23 and the end portion abutting on sticker 12. Collection member 26 may also serve as a pressing member that presses sticker 12 from above after sticker 12 is placed on sticking target 13. Guide block 28 is a member provided so as to cover an outer periphery of collection member 26, and support surface 29 is formed on a distal end side of guide block 28 so as to surround the outer side of collection member 26. When peeling and sticking device 10 collects sticker 12, the entire outer edge portion of sticker 12 is supported by support surface 29.

Peeling section 30 is inserted between sheet 11 and sticker 12 to peel the end portion of sticker 12. Peeling section 30 is fixed to base portion 22 to be movable up and down with respect to collection section 25. Peeling section 30 includes peeling member 31, peeling drive section 32, and cylinder section 33. Peeling section 30 is disposed on the side surface of base portion 22 on the opposite side to inclination direction D (refer to FIG. 2) in which support section 23 is tilted and inclined. Peeling member 31 is one or more insertion pins inserted between sheet 11 and sticker 12. Although peeling section 30 has four insertion pins as peeling member 31, the number of the insertion pins is any number. In peeling section 30, as illustrated in FIG. 7, peeling member 31 is fixed to cylinder section 33 to be inserted between sheet 11 and sticker 12 in order from the end portion side toward the center side of sticker 12. That is, peeling member 31 is fixed to cylinder section 33 so that the length of peeling member 31 becomes shorter toward the center side of sticker 12 along the long side direction of sticker 12. Peeling member 31 is fixed to cylinder section 33 so that the direction of the distal end thereof is inclined downward toward sticker 12 side. Inclination angle $\theta2$ of peeling member 31 is set to an appropriate range in which peeling member 31 easily enters the lower surface of sticker 12 when peeling member 31 contacts with the end portion of sticker 12, for example, according to inclination angle $\theta1$ of support section 23 and the size of sticker 12. Inclination angle $\theta2$ is preferably in a range of 10° or more and 45° or less with respect to the horizontal direction. Inclination angle $\theta2$ of peeling member 31 is preferably 12.5° or more, more preferably 15° or more, and may be 17.5° or more or 20° or more. Inclination angle $\theta2$ is preferably 40° or less, more preferably 35° or less, and may be 30° or less or 25° or less. Inclination angle $\theta2$ is preferably set in accordance with inclination angle $\theta1$ of support section 23. With inclination angle $\theta2$ in this range, peeling member 31 can be inserted into the lower surface of sticker 12 at an angle closer to parallel when support section 23 is inclined. Peeling member 31 is inserted between sheet 11 and sticker 12 in a state where collection section 25 abuts on sticker 12 and support section 23 is inclined. In peeling section 30, peeling member 31 in which the R shape, the length, the thickness, and the inclination angle of the distal end are selected according to the material and the size of sticker 12 and sheet 11 is mounted on cylinder section 33. Peeling drive section 32 moves peeling member 31 up and down along the vertical direction with respect to sticker 12, and may be, for example, an air cylinder or a linear motor. Peeling drive section 32 may integrally move all the peeling members 31 up and down, or may independently move the peeling members 31 up and down separately. Cylinder section 33 is a columnar member that moves up and down along the vertical direction of end effector 20 by peeling drive section 32. Peeling member 31 is detachably fixed to the lower end of cylinder section 33. As illustrated in FIG. 7, in peeling section 30, cylinder section 33 is disposed at a position where peeling member 31 is inserted while holding holes 42 for fixing sticker 12 are arranged and formed. In peeling section 30, peeling member 31 is easily inserted between sheet 11 and sticker 12 as compared with a case where peeling member 31 is inserted next to holding hole 42.

Fixing section 34 fixes support section 23 at an inclined position where support section 23 is inclined and/or at a vertical position where support section 23 is along the vertical direction of end effector 20. Fixing section 34 includes posture maintaining section 35, biasing section 36, and stopper 37. Posture maintaining section 35 is a device that fixes support section 23 at an inclined position where support section 23 is inclined. Posture maintaining section 35 may be, for example, a solenoid valve or an electromagnetic valve that fixes a position member which is disposed in support section 23 and whose position changes together with the inclination of support section 23. Biasing section 36 is a member that biases support section 23 in a side of end effector 20 in the vertical direction. Biasing section 36 may be, for example, a rotation spring that is supported by the support shaft of swinging section 24 and applies a biasing force to support section 23 in a predetermined rotation direction. Stopper 37 is a member that holds support section 23 at a position along the vertical direction of end effector 20. Stopper 37 is a member that restricts the movement of support section 23 so that support section 23 does not rotate beyond the vertical position. As illustrated in FIGS. 2 and 3, stopper 37 includes fixing plate 37a fixed to base portion 22 and fixing screw 37b disposed on the distal end side of fixing plate 37a. In stopper 37, a fixing angle of support section 23 can be finely adjusted according to a tightening position of fixing screw 37b.

Imaging section 38 is a device that acquires a captured image obtained by imaging sticker 12 and sticking target 13 on sheet 11. The captured image obtained by imaging section 38 is output to control PC 60, and is used to detect the peeling position and the sticking position of sticker 12.

Pressing section 44 is a member that presses sticker 12 in order to prevent sticker 12 from being peeled after sticker 12 is stuck to sticking target 13. As illustrated in FIG. 2, pressing section 44 is fixed to base portion 22 on inclination direction D side in which support section 23 is inclined. Pressing section 44 includes pressing member 45 that contacts sticker 12 and presses sticker 12, and a pressing drive section (not illustrated) that moves pressing member 45 up and down. Pressing member 45 is a rectangular parallelepiped member having a pressing surface with an area equal to or larger than that of sticker 12. The pressing drive section moves pressing member 45 up and down between a pressing position and a retracted position, and includes an air cylinder, a linear motor, a ball screw, or the like. Pressing member 45 is disposed on base portion 22 to be lifted and lowered between the retracted position and the pressing position by the pressing drive section, lowered to the pressing position when pressing sticker 12, and lifted to the retracted position when not pressing sticker 12.

Cleaning section 46 is a unit that cleans collection section 25 and/or peeling section 30. Cleaning section 46 blows compressed air to collection section 25 and peeling section 30 to remove foreign matter attached thereto. Cleaning section 46 includes cleaning hole 47 through which compressed air is discharged, and a supply pipe (not illustrated) that supplies compressed air to cleaning hole 47. Although cleaning section 46 is an air blow-type unit, for example, cleaning section 46 may be a unit that removes foreign matter from collection section 25 and/or peeling section 30 by applying and/or immersing a cleaning liquid, or may be a unit that removes foreign matter from collection section 25 and/or peeling section 30 by using a member such as a brush.

Sheet holding section 40 is a unit that fixes sheet 11. As illustrated in FIG. 5, sheet holding section 40 has placement section 41 having a placement surface on which sheet 11 is placed, and holding hole 42 for fixing sheet 11 placed on placement section 41 by applying negative pressure thereto. In sheet holding section 40, the method of fixing sheet 11 may be a method other than the method of applying a negative pressure, that is, sheet 11 may be fixed by using electrostatic force, magnetic force, or the like, or by gripping the end portion of sheet 11 or the like.

Arm robot 50 is configured as a moving section that moves end effector 20 on sheet 11 fixed to sheet holding section 40 at least. Arm robot 50 may be, for example, a vertical articulated five-axis robot or a six-axis robot. Arm robot 50 includes mounting section 51, connection head 52, arm 55, drive motor 56, and pedestal portion 57. Mounting section 51 is a section in which end effector 20 can be mounted and detached, and is disposed on a lower surface side of connection head 52. Mounting section 51 has a lock mechanism that is locked when end effector 20 is mounted on arm robot 50. When peeling end effector 20 from arm robot 50, an operator releases the lock mechanism. Connection head 52 is a base portion on which end effector 20 is detachably mounted, and is disposed at a distal end of arm 55. Arm 55 is multiple members pivotally supported by joint shafts, and freely rotates around the joint shafts to move end effector 20 in a three-dimensional space in the front-rear, left-right, and up-down directions. Drive motor 56 is disposed on each joint shaft and rotationally drives the joint shaft. Pedestal portion 57 supports and installs arm 55. Sheet holding section 40 and sticking target 13 are disposed within the movement range of end effector 20. Here, arm robot 50 is used as the moving section, but as long as end effector 20 can be freely moved, an XY robot that can move end effector 20 in the up-down direction may be used.

Control PC 60 controls each device of peeling and sticking device 10. Control PC 60 includes control section 61, storage section 62, communication section 64, display section 65, and operation section 66. Control section 61 is configured as a microprocessor centered on the CPU, and controls entire peeling and sticking device 10. Control section 61 outputs a drive signal to posture maintaining section 35, imaging section 38, drive motor 56, and the like. After control section 61 causes collection section 25 to abut on sticker 12, control section 61 moves end effector 20 in inclination direction D in which support section 23 is inclined, inserts peeling section 30 between sticker 12 and sheet 11 in a state of applying a force in the peeling direction to sticker 12 via following section 27 to peel sticker 12 from sheet 11, and moves peeled sticker 12. Control section 61 releases the inclination of support section 23, and sticks sticker 12 held by collection section 25 at the sticking position in a state where peeling section 30 is retracted from below sticker 12. Storage section 62 is a large-capacity storage medium such as a flash memory, and stores a program for controlling peeling and sticking device 10, and list information including information on the shape and arrangement position of sticker 12, the shape and arrangement position of sticking target 13, the order of peeling and peeling position of sticker 12, and the sticking position, or the like. Communication section 64 is an interface that exchanges information with an external device such as a management device (not illustrated). Display section 65 is a display for displaying information to the operator. Operation section 66 includes a keyboard, a mouse, and the like for which various inputs are performed by the operator. In peeling and sticking device 10, end effector 20, sheet holding section 40, and arm robot 50 are controlled by one control PC 60, but control section may be provided in each device, and four or more control sections may share each control processing.

Figure 9:
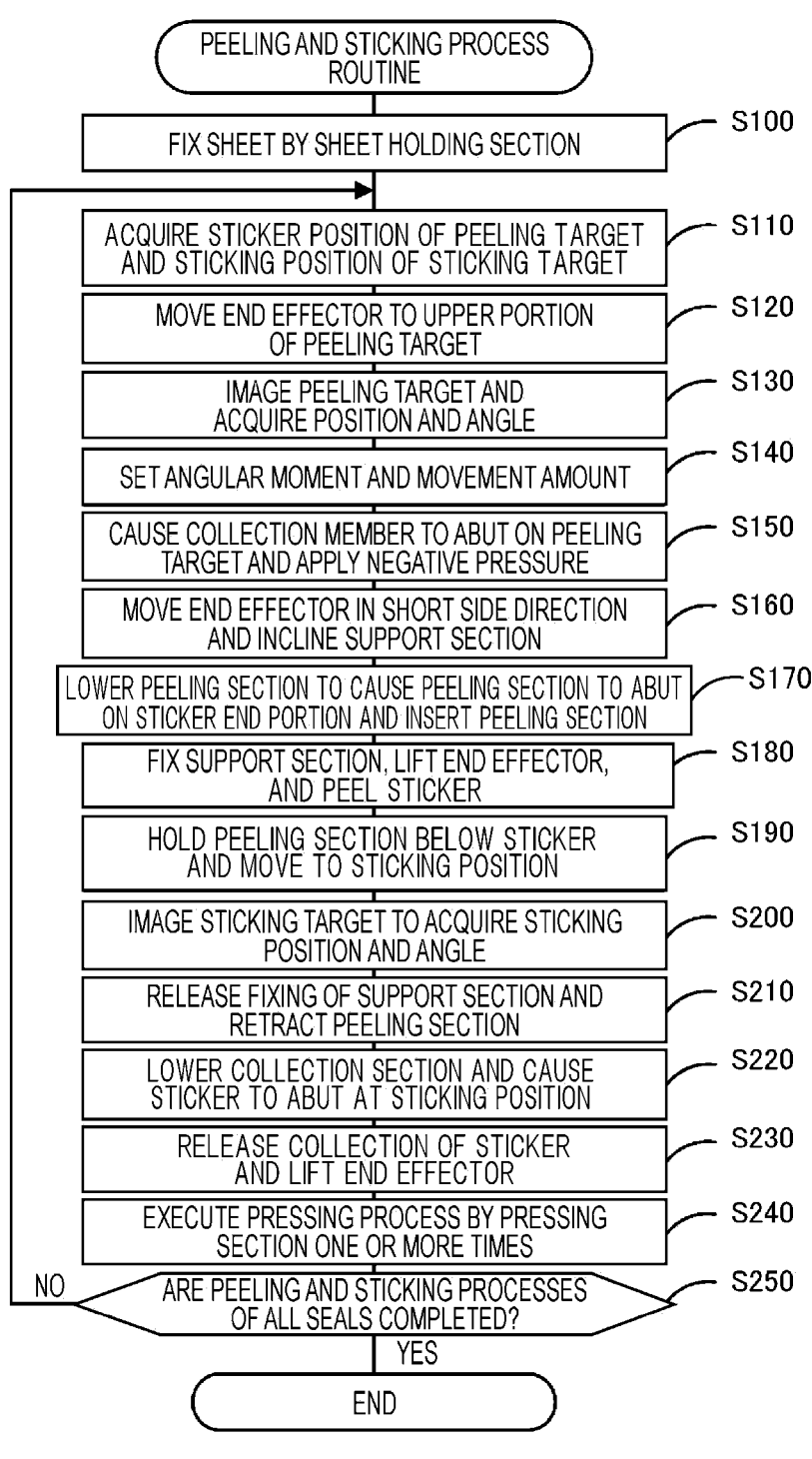
FIG. 9 is a flowchart illustrating an example of a peeling and sticking process routine.
Figure 13A:
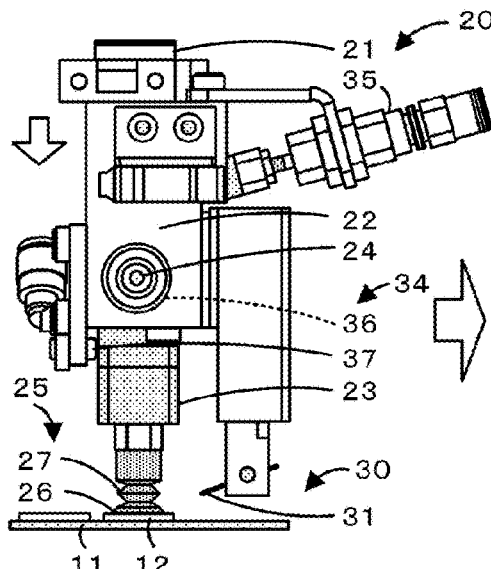
FIG. 13 is a view of a series of processes for peeling sticker 12.
Figure 13B:
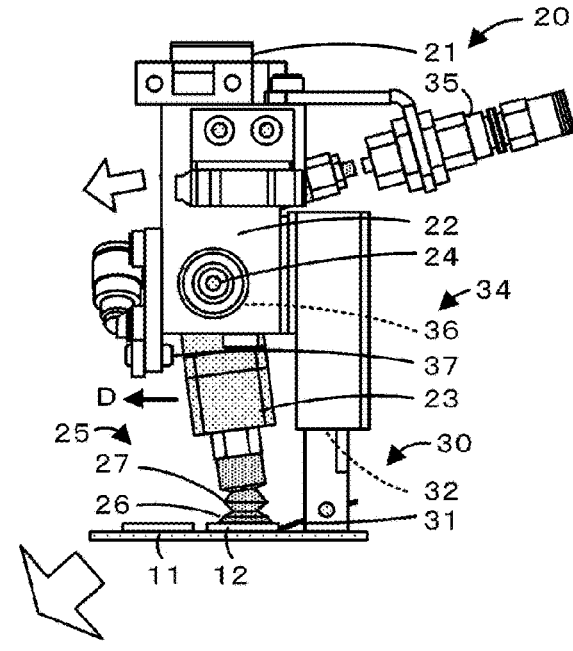
Figure 13C:
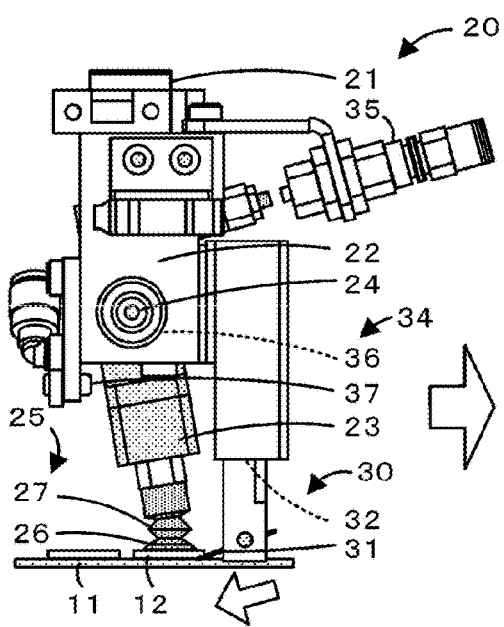
Figure 13D:
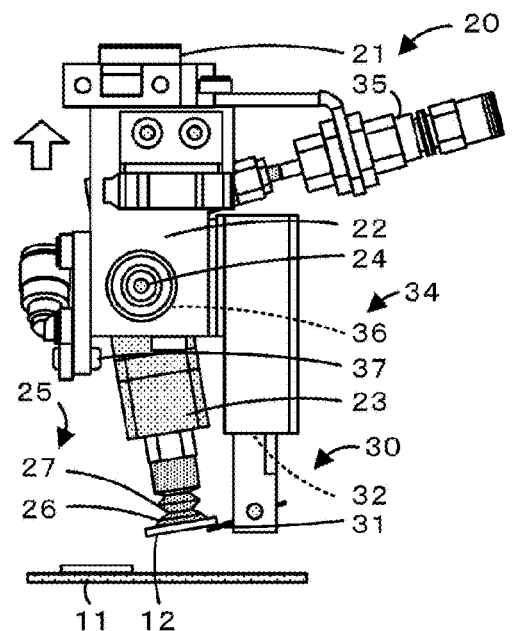
Figures 14A, 14B, 14C:
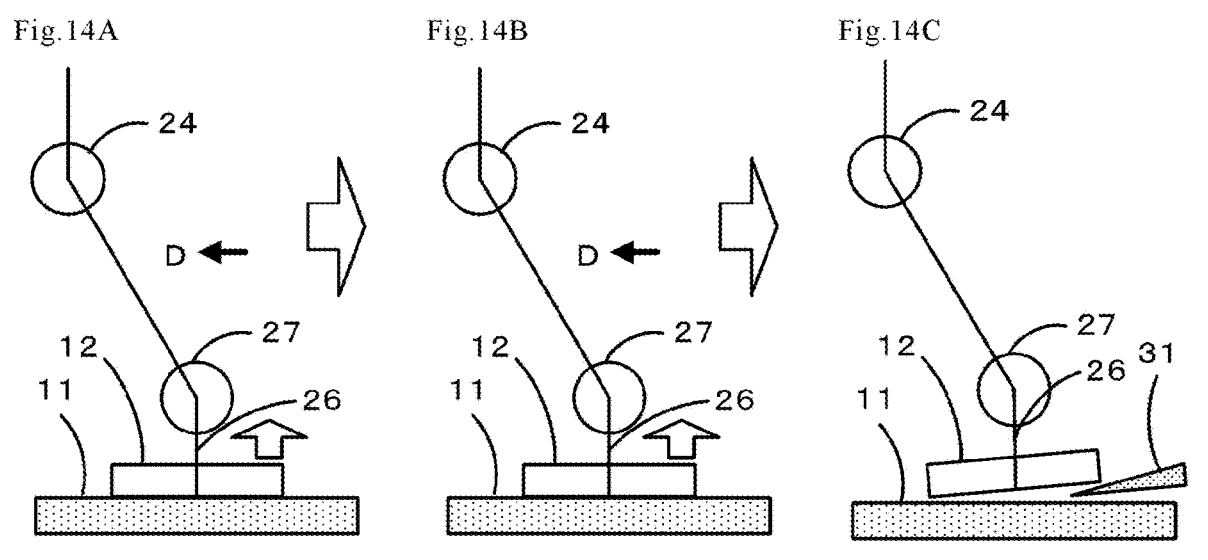
Figure 15A:
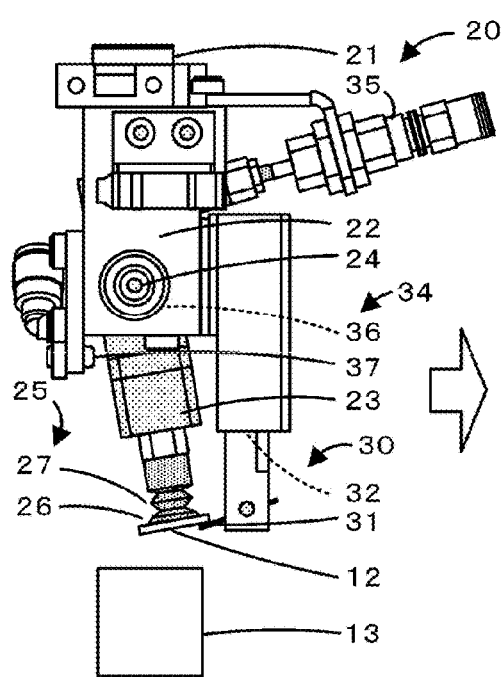
FIG. 15 is a view of a series of processes for sticking sticker 12 to sticking target 13.
Figure 15B:
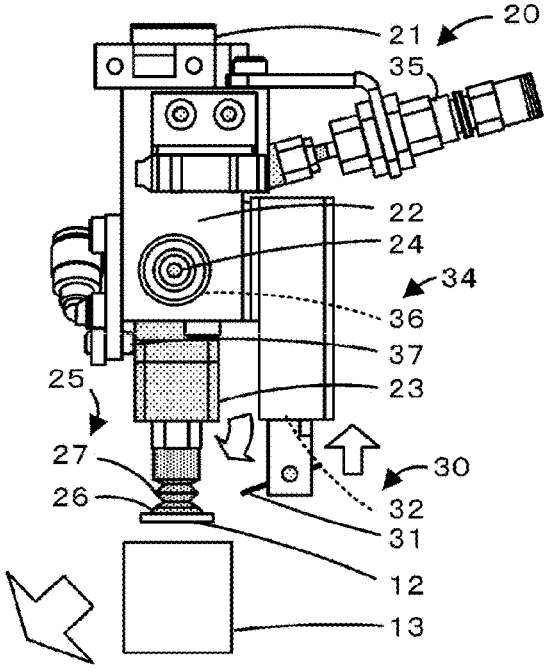
Figure 15C:
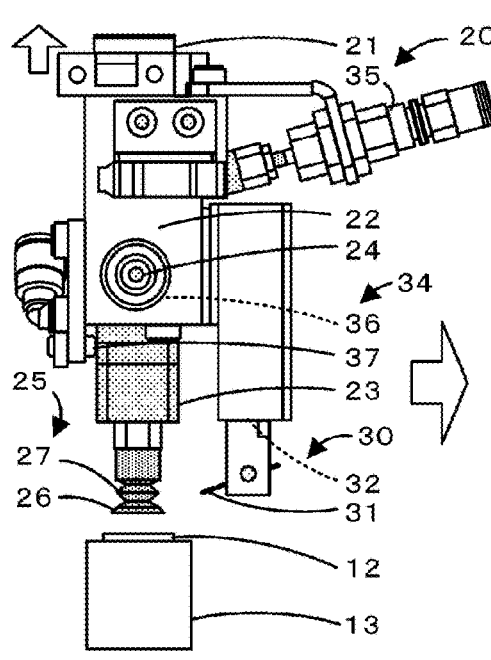
Figure 15D:
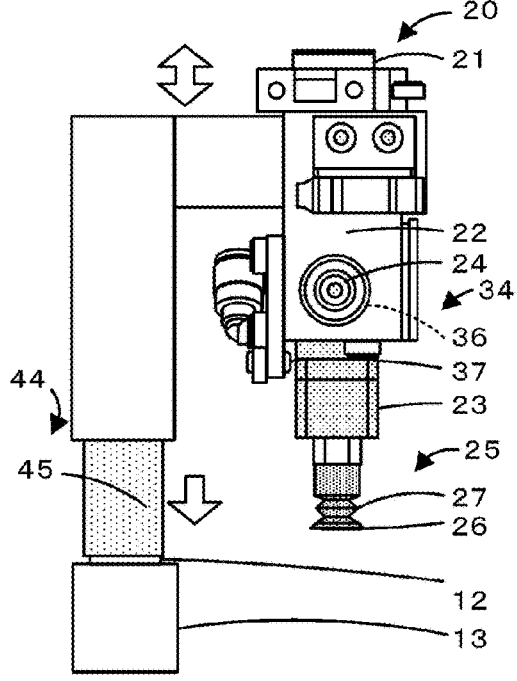
Figure 16:
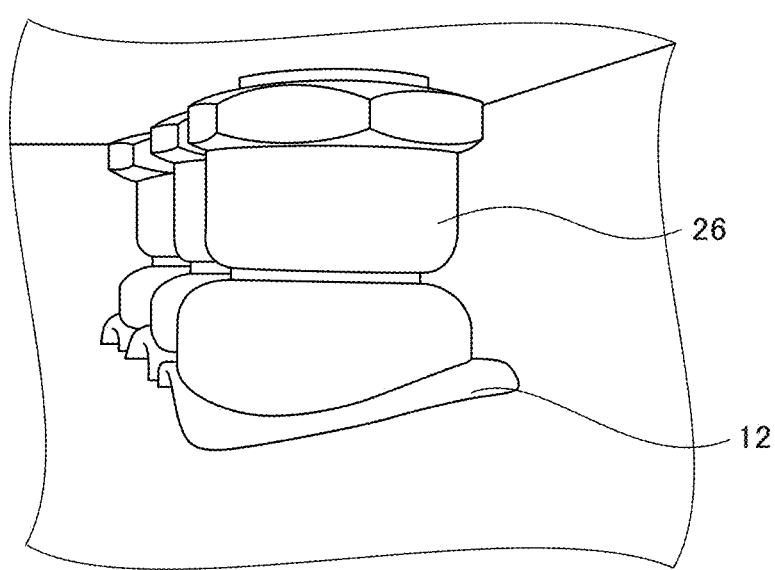
FIG. 16 is another diagram when sticker 12 is collected by multiple collection sections 25.
Figure 17:
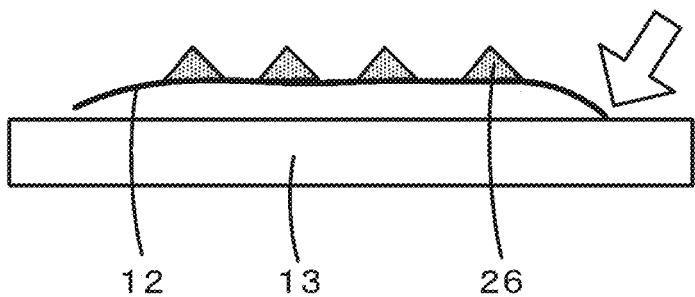
FIG. 17 is a diagram when sticker 12 is stuck.
Figure 18:
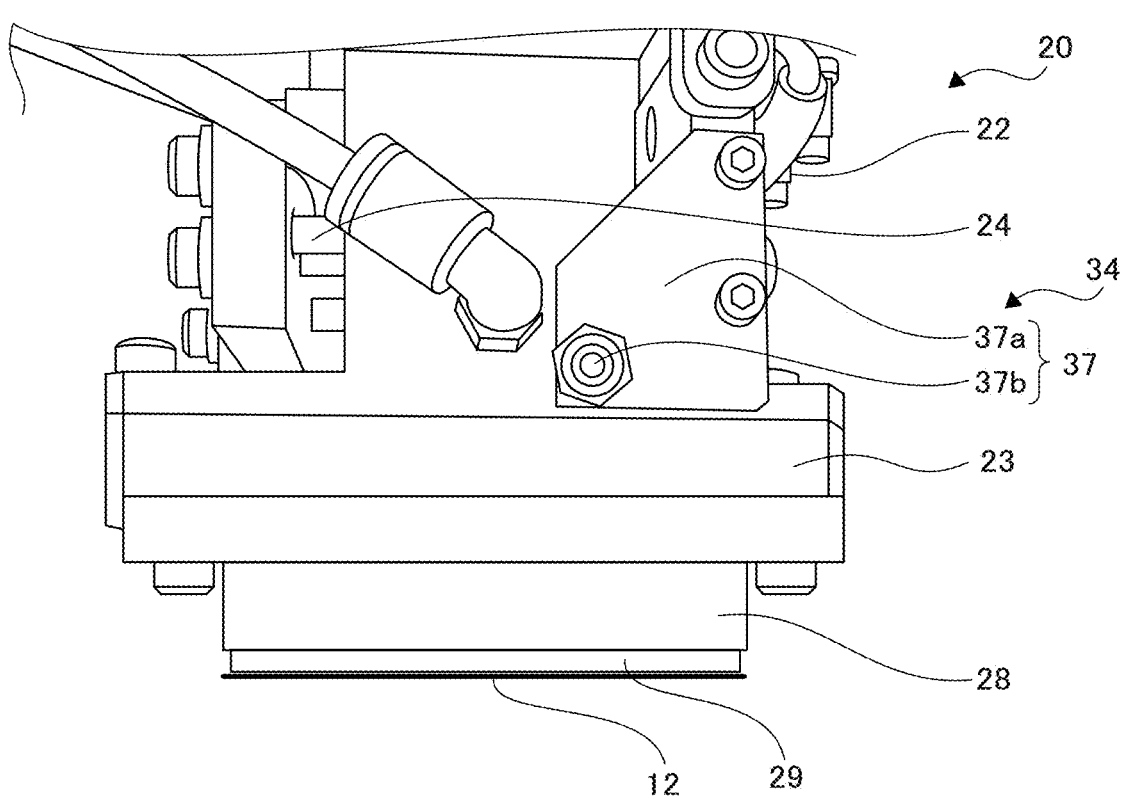
FIG. 18 is a diagram for holding sticker 12 by guide block 28.

Next, a peeling and sticking process of sticker 12 by peeling and sticking device 10 configured in this manner will be described. FIG. 9 is a flowchart illustrating an example of a peeling and sticking process routine executed by control section 61 to operate arm robot 50. FIG. 10 is a flowchart illustrating an example of a cleaning process routine executed by control section 61. FIG. 11 is a diagram of an example of detecting the direction of sticker 12. FIG. 12 is a diagram illustrating an example of the position of end effector 20 in the peeling process of sticker 12. FIG. 13 is a view of a series of processes of peeling sticker 12, in which FIG. 13A is a view in which collection member 26 abuts on sticker 12, FIG. 13B is a view in which support section 23 is inclined, FIG. 13C is a view in which peeling member 31 abuts on sticker 12, and FIG. 13D is a view in which sticker 12 is peeled. FIG. 14 is a conceptual diagram of a series of processes for peeling sticker 12, in which FIG. 14A is a diagram in which collection member 26 abuts on sticker 12, FIG. 14B is a diagram in which a force in the peeling direction is applied to collection member 26, and FIG. 14C is a diagram for creating a trigger for peeling by peeling member 31. FIG. 15 is a diagram of a series of processes of sticking sticker 12 to sticking target 13, in which FIG. 15A is a diagram of moving directly above sticking target 13, FIG. 15B is a diagram of releasing the inclination of support section 23, FIG. 15C is a diagram of sticking sticker 12 to sticking target 13, and FIG. 15D is a diagram of pressing sticker 12. FIG. 16 is another diagram when sticker 12 is collected by multiple collection sections 25. FIG. 17 is a diagram of an example when sticker 12 is stuck. FIG. 18 is a diagram for holding sticker 12 by guide block 28.

First, a process when peeling and sticking device 10 peels sticker 12 from sheet 11 will be described. The peeling and sticking process routine in FIG. 9 is stored in storage section 62, and is executed after inputting the execution command for sticking process of sticker 12 from the operator. When this routine starts, the CPU of control section 61 first executes a process of fixing sheet 11 by sheet holding section 40 (S100). The operator places sheet 11 on which sticker 12 is stuck to placement section 41. Control section 61 supplies a negative pressure to holding hole 42 of sheet holding section 40, and fixes sheet 11 on placement section 41 by the negative pressure. Next, control section 61 acquires information relating to the position of sticker 12 of the peeling target and the sticking position of sticking target 13 (S110). Control section 61 reads, for example, list information stored in storage section 62 in advance, and acquires the list information.

Next, based on the acquired information, control section 61 moves end effector 20 to the upper portion of sticker 12 which is the peeling target (S120), images the peeling target by imaging section 38, and acquires the detailed position and angle thereof (S130, imaging step). Control section 61 may detect sticker 12 included in the captured image by known matching processing and acquire the position and the angle. When the position and the angle of sticker 12 are acquired, control section 61 sets an angle vector direction of end effector 20 according to the position and the angle, and sets a movement amount (S140, setting step). As illustrated in FIG. 11, even when sticker 12 has various angles, control section 61 sets the angle vector (refer to white arrow) of end effector 20 such that peeling section 30 comes into contact with a code display field from the long side, for example. At this time, control section 61 sets the amount of movement of end effector 20 in the up-down and left-right directions according to the angle vector (refer to FIG. 12). The posture of end effector 20 in the peeling process is determined by the set value. That is, control section 61 images sticker 12 on sheet 11, sets the position and the direction of collection member 26 based on the obtained captured image, and sets inclination direction D in which collection member 26 is inclined with respect to the vertical direction and the insertion direction of peeling member 31.

Next, control section 61 causes collection member 26 to abut on the surface of sticker 12 of the peeling target based on the set angle vector and movement amount, and applies a negative pressure (S150, FIG. 13A). For example, control section 61 lowers end effector 20 in the Z axis direction with the coordinates and the movement amount of end effector 20 as illustrated in S1 of FIG. 12. Next, control section 61 moves end effector 20 in the short side direction orthogonal to the long side direction to incline support section 23 (S160, applying step, FIG. 13B). Control section 61 horizontally moves end effector 20 in the X axis direction with the coordinates and the movement amount of end effector 20 as illustrated in S2 of FIG. 12, for example. In this step, collection member 26 for collecting sticker 12 abuts on the surface of sticker 12, and a force can be applied to the sticker in inclination direction D inclined with respect to the vertical direction of the surface. That is, in this step, a force in the peeling direction (upward) is applied to the end portion of sticker 12 on the side opposite to inclination direction D.

Next, control section 61 lowers peeling section 30, causes peeling member 31 to abut on the end portion of sticker 12, and inserts peeling member 31 into the lower portion of sticker 12 (S170, inserting step, FIG. 13C). Control section 61 slightly moves end effector 20 in the X axis direction and the Z axis direction with the coordinates and the movement amount of end effector 20 as illustrated in S3 of FIG. 12, for example. Peeling member 31 enters the inside of sticker 12 in a state of being pressed against sheet 11. In this step, in the end portion of sticker 12 on the side opposite to inclination direction D, peeling member 31 is inserted between sticker 12 and sheet 11 to peel sticker 12. That is, in this step, peeling member 31 is inserted into the end portion of sticker 12 to which the force in the peeling direction (upward) is applied, and a sticking force of sticker 12 to sheet 11 is released. In this step, peeling member 31 is inserted between sheet 11 and sticker 12 in order from the end portion side toward the center side of the short side of sticker 12 (refer to FIG. 7). When peeling member 31 is pushed below sticker 12, a trigger for peeling sticker 12 is given, and peeling property of sticker 12 is further improved. In particular, in end effector 20, since peeling member 31 is inserted in order from the short side end portion which is the outside of sticker 12 toward the center side, sticker 12 can be peeled more reliably.

Next, control section 61 causes posture maintaining section 35 to fix the posture of support section 23 in the inclined state, and lifts end effector 20 to peel sticker 12 from sheet 11 (S180, FIG. 13D). For example, control section 61 lifts end effector 20 in the X axis direction and the Z axis direction with the coordinates and the movement amount of end effector 20 as illustrated in S4 of FIG. 12. Peeled sticker 12 is stably supported in a state where the entire outer edge portion thereof is in contact with support surface 29 of guide block 28. Then, control section 61 moves sticker 12 to the coordinates of the sticking position of sticking target 13 in a state where peeling section 30 is held below sticker 12 (S190, moving step). In this step, after sticker 12 is peeled, sticker 12 is moved in a state where peeling member 31 is disposed below sticker 12. Control section 61 prevents falling of sticker 12 or the like by disposing peeling member 31 below sticker 12. In this way, control section 61 can more reliably peel sticker 12 which is relatively difficult to peel sticker 12 by the automatic robot.

Here, a peeling mechanism of sticker 12 by end effector 20 will be described with reference to FIG. 14. End effector 20 includes swinging section 24, collection member 26, and following section 27. From the state in which collection member 26 abuts on sticker 12 (FIG. 14A), the force in inclination direction D is applied to collection member 26 using two shafts of swinging section 24 and following section 27 (FIG. 14B). That is, after collection section 25 abuts on sticker 12, control section 61 moves swinging section 24 (base portion 22) in inclination direction D in which support section 23 is inclined, inclines support section 23 using swinging section 24 and following section 27, and applies a force in the peeling direction to sticker 12 via collection member 26. Thus, a force in the peeling direction is applied to the end portion of sticker 12. Then, sticker 12 is provided with a trigger to peel by the end portion being poked with peeling member 31 (FIG. 14C). That is, control section 61 inserts peeling member 31 between sticker 12 and sheet 11 to peel sticker 12 from sheet 11 in a state where the force in inclination direction D is applied to sticker 12. Even when collection member 26 is simply lifted, sticker 12 is stably stuck onto sheet 11, and collection member 26 less comes off and is less likely to be peeled than the peeling of sticker 12. In this peeling method, in addition to applying a force in inclination direction D to sticker 12, sticker 12 can be peeled by putting peeling member 31 into the end portion. Due to this mechanism, swinging section 24 has an any configuration. In addition, since following section 27 does not apply a force to sticker 12 when following section 27 can swing without resistance, following section 27 has resistance to the extent that a force in the peeling direction can be applied to sticker 12 when following section 27 swings.

Next, a process when peeling and sticking device 10 sticks sticker 12 to sticking target 13 will be described. When sticker 12 is moved above sticking target 13 in S190 (FIG. 15A), control section 61 images sticking target 13 by imaging section 38 and acquires the sticking position of sticking target 13 and the angle of sticker 12 (S200). Control section 61 extracts sticking target 13 included in the captured image by image analysis, and acquires the sticking position and the angle thereof. Next, control section 61 causes posture maintaining section 35 to release the fixing of support section 23 in the inclined state and lifts peeling member 31 to the retracted position (S210, FIG. 15B). Next, control section 61 lowers collection section 25, causes sticker 12 to abut at the sticking position, and sticks sticker 12 (S220). In this manner, control section 61 sticks sticker 12 held by collection member 26 at the sticking position in a state where peeling member 31 is retracted from below peeled sticker 12. Next, control section 61 supplies the positive pressure to collection member 26 to release the collection state of sticker 12, and lifts end effector 20 (S230, FIG. 15C). In this way, control section 61 can stick sticker 12 at the sticking position.

Here, the sticking of sticker 12 will be described. As illustrated in FIG. 16, for example, in collection section 25 that does not include guide block 28, since multiple circular pads of collection member 26 are arranged, sticker 12 is not sampled in a planar shape, and the surface may be waved and/or deflected. In such a case, as illustrated in FIG. 17, an end portion of a part of sticker 12 may come into contact with sticking target 13 for the first time, so that wrinkles or the like may occur in sticker 12 stuck to sticking target 13. Meanwhile, as illustrated in FIG. 18, since end effector 20 includes guide block 28, the outer edge portion of sticker 12 in a state of being collected in collection section 25 is supported by support surface 29 over the entire circumference, and sticker 12 can be held in a relatively planar shape. In this way, in peeling and sticking device 10 in which the outer edge portion of sticker 12 is held by guide block 28, when sticker 12 is stuck to sticking target 13, it is possible to prevent the occurrence of deflection or wrinkles.

Subsequently, after S230, control section 61 performs the pressing process on sticker 12 by pressing section 44 one or more times (S240, FIG. 15D). In the pressing process, for example, control section 61 causes arm robot 50 to lower pressing member 45 to below collection section 25 and press sticker 12 placed at the sticking position from above. Control section 61 may capture an image of sticker 12 stuck to sticking target 13 by imaging section 38 before performing the pressing process by pressing section 44, and may inspect whether the sticking position of sticker 12 is appropriate, whether sticker 12 has deflection, wrinkles, or the like based on the captured image. Then, control section 61 determines whether the peeling and sticking processes of all stickers 12 are completed (S250), and when the peeling and sticking processes of all stickers 12 are not completed, control section 61 executes the process of S110 and thereafter. That is, control section 61 acquires the next sticker position and the next sticking position from above the list, and repeatedly executes the peeling process, the moving process, and the sticking process described above. Meanwhile, when all the peeling and sticking processes are completed in S250, this routine is ended. In this manner, peeling and sticking device 10 can peel sticker 12 from sheet 11 and stick sticker 12 to sticking target 13 in a clean state with no wrinkles.

Next, the cleaning process of collection section 25 and/or peeling section 30 will be described. In the cleaning process, control section 61 executes the flowchart illustrated in FIG. 10. This routine is executed by control section 61 in parallel when the peeling and sticking process is executed. When this routine is started, control section 61 determines whether the cleaning timing has been reached (S300). For example, control section 61 can execute this determination based on one or more conditions such as whether an operation time of end effector 20 has reached a predetermined time (for example, 100 hours, 500 hours, or the like), whether a predetermined number (for example, 100 sheets, 500 sheets, or the like) of stickers 12 have been peeled and stuck, and whether an abnormality has occurred in stuck stickers 12. When it is the cleaning timing, control section 61 executes the cleaning process of collection section 25 and/or peeling section 30 (S310). In the cleaning process, control section 61 executes a process of removing foreign matter by blowing compressed air from cleaning hole 47 to collection section 25 and/or peeling section 30. After S310 or when it is not the cleaning timing in S300, control section 61 determines whether the peeling and sticking processes of all stickers 12 are completed (S320). When the peeling and sticking processes of all stickers 12 are not completed, control section 61 repeatedly executes the process after S300, and when the peeling and sticking processes of all stickers 12 are completed in S320, this routine is ended. As described above, in peeling and sticking device 10, since the foreign matter of collection section 25 or peeling section 30 is removed, the peeling and sticking process can be more reliably continued.

Here, a correspondence relationship between the elements of the present embodiment and the elements of the present disclosure will be clarified. The process of S160 of the present embodiment corresponds to an applying step of the present disclosure, the process of S170 corresponds to an inserting step, the process of S190 corresponds to a moving step, the process of S130 corresponds to an imaging step, and the process of S140 corresponds to a setting step. Collection member 26 of the present embodiment corresponds to a collection member of the present disclosure, peeling member 31 corresponds to a peeling member, support section 23 corresponds to a support section, swinging section 24 corresponds to a swinging section, and following section 27 corresponds to a following section.

Peeling and sticking device 10 of the present embodiment described above includes end effector 20 mounted on mounting section 51. End effector 20 includes collection section 25 that abuts on the surface of sticker 12 and collect sticker 12, support section 23 that supports collection section 25 and can incline collection section 25 with respect to the vertical direction of sticker 12 stuck to sheet 11, following section 27 that causes collection section 25 to follow the surface of the sticker when support section 23 is inclined, and peeling section 30 that is inserted between sheet 11 and sticker 12 to peel the end portion of sticker 12. In end effector 20, peeling section 30 can be inserted between sheet 11 and the end portion of sticker 12 in a state where collection section 25 abuts on the surface of sticker 12 to incline support section 23 and a force in the peeling direction is applied to sticker 12. In this case, since following section 27 follows, collection section 25 does not come off from sticker 12 when support section 23 is inclined, and a force in the peeling direction can be applied to sticker 12. In end effector 20, sticker 12 can be peeled and moved from sheet 11 by applying a force with which peeling section 30 lifts sticker 12 from the lower surface side and a force with which collection section 25 pulls sticker 12 further upward by pickup. As described above, in end effector 20, sticker 12 can be more reliably peeled and moved from sheet 11 by a relatively simple process of inserting peeling section 30 with support section 23 inclined.

Further, end effector 20 includes fixing section 34 that fixes support section 23 at the inclined position where support section 23 is inclined and/or a vertical position along the vertical direction of end effector 20. In end effector 20, since support section 23 can be fixed at the inclined position or the vertical position, for example, before and after the peeling of sticker 12, the same posture can be easily held, and end effector 20 can be easily peeled and moved. Further, fixing section 34 includes biasing section 36 that biases support section 23 toward the vertical direction side of end effector 20, and stopper 37 that holds support section 23 at a position along the vertical direction of end effector 20. In end effector 20, support section 23 is held along the vertical direction, the biasing force needs only to be released when support section 23 is inclined, and thus, support section 23 can be easily handled. Furthermore, collection section 25 has the pickup pad having flexibility as collection member 26, and the pickup pad also serves as following section 27. In end effector 20, collection section 25 and following section 27 can be achieved using the pickup pad.

Collection section 25 has guide block 28 in which multiple pickup pads are disposed along the long side direction of sticker 12, and support surface 29 for supporting the outer edge portion of sticker 12 is formed outside the pickup pads. In end effector 20, when collection section 25 peels sticker 12 from sheet 11, sticker 12 is lifted by the negative pressure, but the outer edge portion of sticker 12 is pressed against support surface 29 of guide block 28 in front of the lifting end, sticker 12 can be peeled and moved without deflection or the like. In end effector 20, the multiple pickup pads can more reliably peel and move sticker 12. In addition, in end effector 20, since the outer edge portion thereof is supported by guide block 28 when sticker 12 is collected, it is possible to further suppress positional deviation or the like in the sticking. Further, in peeling and sticking device 10, when the shape and the position of sticker 12 are recognized by the captured image, in a case where sticker 12 is deflected or warped, control section 61 may not be able to accurately grasp the size and the center position of sticker 12. In end effector 20, guide block 28 can further suppress the deflection and warpage of sticker 12, and thus the accuracy of the image recognition of sticker 12 can be improved.

Peeling section 30 is disposed on the opposite side of inclination direction D in which support section 23 is inclined. In end effector 20, since peeling section 30 is disposed on the end portion side of sticker 12 on which support section 23 is inclined and a force in the peeling direction is applied, the sticker is easily peeled by peeling section 30. Further, peeling section 30 is inserted between sheet 11 and sticker 12 in a state where collection section 25 abuts on sticker 12 and support section 23 is inclined. In end effector 20, since peeling section 30 is inserted on the end portion side of sticker 12 to which support section 23 is inclined and a force is applied in the peeling direction, the sticker is easily peeled by peeling section 30. Furthermore, peeling section 30 includes one or more insertion pins inserted between sheet 11 and sticker 12 as peeling member 31. In end effector 20, sticker 12 is easily peeled by using the insertion pin. Peeling section 30 is disposed to be inserted between sheet 11 and sticker 12 in order from the end portion side toward the center side of sticker 12. In end effector 20, since sticker 12 is peeled in order from the end portion side, sticker 12 is easily peeled as compared with a case where peeling is started from the central portion.

End effector 20 includes pressing section 44 that presses sticker 12 after sticker 12 is stuck to sticking target 13. In end effector 20, sticker 12 can be more reliably stuck by pressing section 44. End effector 20 further includes base portion 22 mounted on mounting section 51, and swinging section 24 fixed to base portion 22, pivotally supporting support section 23, and swinging support section 23 with respect to base portion 22. In end effector 20, support section 23 can be pivotally supported by base portion 22, and support section 23 can be easily inclined by swinging section 24. Furthermore, peeling section 30 is fixed to base portion 22 to be movable up and down with respect to collection section 25. In end effector 20, when peeling section 30 is inserted between sheet 11 and sticker 12, fine adjustment in the up-down direction can be performed, and sticker 12 is easily peeled. In addition, in end effector 20, peeling section 30 can be moved up and down and retracted, and for example, peeling section 30 is less likely to interfere with the sticking process.

In addition, peeling and sticking device 10 includes end effector 20 described above, mounting section 51 that mounts end effector 20, and arm robot 50 serving as the moving section that moves end effector 20 on sheet 11 at least. Since peeling and sticking device 10 includes end effector 20 described above, sticker 12 can be more reliably peeled and moved from sheet 11 by a relatively simple process of inserting peeling section 30 by inclining support section 23. Peeling and sticking device 10 includes control section 61 that controls arm robot 50 as the moving section. Peeling and sticking device 10 can control any of the configurations of end effector 20 described above by control section 61. Further, control section 61 moves end effector 20 in the direction in which support section 23 is inclined after causing collection section 25 to abut on sticker 12, inserts peeling section 30 between sticker 12 and sheet 11 in a state in which a force in the peeling direction is applied to sticker 12 via following section 27 to peel sticker 12 from sheet 11, and moves peeled sticker 12. In peeling and sticking device 10, sticker 12 can be peeled and moved more reliably.

Control section 61 releases the inclination of support section 23, and sticks sticker 12 held by collection section 25 at the sticking position in a state where peeling section 30 is retracted from below sticker 12. In peeling and sticking device 10, sticker 12 can be stuck to sticking target 13 more reliably. Peeling and sticking device 10 further includes sheet holding section 40 that fixes sheet 11 on placement section 41. In peeling and sticking device 10, sheet 11 is fixed by sheet holding section 40, and thus sticker 12 is easily peeled from the end portion of sticker 12. Furthermore, peeling and sticking device 10 includes cleaning section 46 that cleans collection section 25 and/or peeling section 30. Peeling and sticking device 10 can further clean the configuration of end effector 20 by cleaning section 46, and can more reliably peel and move sticker 12 from sheet 11.

The peeling and sticking method described in the embodiment is the method executed by peeling and sticking device 10 including collection member 26 for collecting sticker 12 and peeling member 31 for peeling sticker 12 and peeling sticker 12 from sheet 11 to which one or more stickers 12 are stuck, and the method includes the applying step, the inserting step, the moving step, or the like. In the applying step, collection member 26 for collecting sticker 12 abuts on the surface of sticker 12, and a force is applied to sticker 12 in inclination direction D inclined with respect to the vertical direction of the surface. In addition, in the inserting step, peeling member 31 is inserted between sticker 12 and sheet 11 in the end portion of sticker 12 on the side opposite to inclination direction D, and sticker 12 is peeled. In the moving step, the peeled sticker is moved. In this peeling and sticking method, collection member 26 abuts on the surface of sticker 12 and is inclined, and peeling member 31 is inserted between sheet 11 and the end portion of sticker 12 in a state where a force is applied to the sticker in inclination direction D, so that sticker 12 can be peeled. As described above, in the peeling and sticking method, sticker 12 can be more reliably peeled and moved from sheet 11 by a relatively simple process of applying a force to sticker 12 in inclination direction D by collection member 26 to insert peeling member 31 into the end portion.

In addition, in the peeling and sticking method, in the applying step, the direction orthogonal to the long side direction of sticker 12 is set as inclination direction D. In this peeling and sticking method, sticker 12 can be peeled more easily than when sticker 12 is inclined in the direction orthogonal to the short side direction of sticker 12. Further, in the peeling and sticking method, in the applying step, collection member 26 is inclined in a range in which collection member 26 does not come off from contact sticker 12. In this peeling and sticking method, since sticker 12 is more reliably held by collection member 26, sticker 12 can be more reliably peeled and moved. Furthermore, in the peeling and sticking method, in the applying step, it is inclined in a range of 10° or more and 45° or less with respect to the vertical direction. When the inclination angle is 10° or more, it is possible to further improve the application of the force in the peeling direction, and when the inclination angle is 45° or less, it is possible to further prevent the collection member from coming off from the sticker. In the peeling and sticking method, in the inserting step, peeling member 31 is inserted between sheet 11 and sticker 12 in order from the end portion side toward the center side of sticker 12. In this peeling and sticking method, since sticker 12 is peeled off in order from the end portion side, sticker 12 is easily peeled as compared with a method in which peeling is started from the central portion.

In the peeling and sticking method, in the moving step, after sticker 12 is peeled, sticker 12 is moved in a state where peeling member 31 is disposed below sticker 12. In this peeling and sticking method, since peeling member 31 is positioned below peeled sticker 12, peeled sticker 12 can be protected. In the peeling and sticking method, in the moving step, sticker 12 held by collection member 26 is stuck at the sticking position in a state where peeling member 31 is retracted from below peeled sticker 12. In the peeling and sticking method, sticker 12 can be stuck at the sticking position more reliably. Further, in the moving step, after peeled sticker 12 is stuck at the sticking position, the pressing process is executed by pressing member 45. In this peeling and sticking method, sticker 12 can be stuck to the sticking target 13 more reliably by the pressing process. Furthermore, the peeling and sticking method includes the imaging step of imaging sticker 12 on sheet 11, and the setting step of setting the position and the direction of collection member 26 and setting the direction in which peeling member 31 is inclined with respect to the vertical direction and the insertion direction of peeling member 31 based on the captured image obtained in the imaging step, and the applying step and the inserting step are executed based on the set contents. In this peeling and sticking method, the position and direction of sticker 12 on sheet 11 can be recognized to perform a more appropriate peeling operation.

In addition, in the peeling and sticking method, peeling and sticking device 10 includes support section 23 that supports collection member 26 and can incline collection section 25 with respect to the vertical direction of sticker 12, following section 27 which causes collection section 25 to follow the surface of sticker 12 when support section 23 is inclined, and swinging section 24 which pivotally supports support section 23 and swings support section 23, in the applying step, after causing collection member 26 to abut on sticker 12, swinging section 24 is moved in inclination direction D in which support section 23 is inclined, support section 23 is inclined by swinging section 24 and following section 27, and the force in the peeling direction is applied to sticker 12 via collection member 26, and in the inserting step, peeling member 31 is inserted between sticker 12 and sheet 11 in a state where the force in the peeling direction is applied to sticker 12, and sticker 12 is peeled from sheet 11. In this peeling and sticking method, support section 23 is inclined by swinging section 24, and in this case, following section 27 causes collection member 26 to follow the surface of sticker 12, and therefore, when support section 23 is inclined, collection section 25 can apply the force in the peeling direction to sticker 12 without coming off from sticker 12. In this peeling and sticking method, it is possible to more reliably peel and move sticker 12 from sheet 11 using swinging section 24, support section 23, and following section 27.

It should be noted that the end effector, the peeling and sticking device, the peeling and sticking method, and the program thereof of the present disclosure are not limited to the embodiments described above, and can be performed in various modes as long as they belong to the technical scope of the present disclosure.

For example, in the embodiment described above, posture maintaining section 35 that fixes support section 23 at the inclined position and fixing section 34 having biasing section 36 and stopper 37 that fix support section 23 at the vertical position are provided, but either fixing at the inclined position or fixing at the vertical position may be omitted, and fixing section 34 may be omitted. Even in end effector 20, the force in the peeling direction can be applied to sticker 12 by a relatively simple process of inclining collection member 26 and inserting peeling member 31, and sticker 12 can be more reliably peeled from sheet 11.

Figure 19:
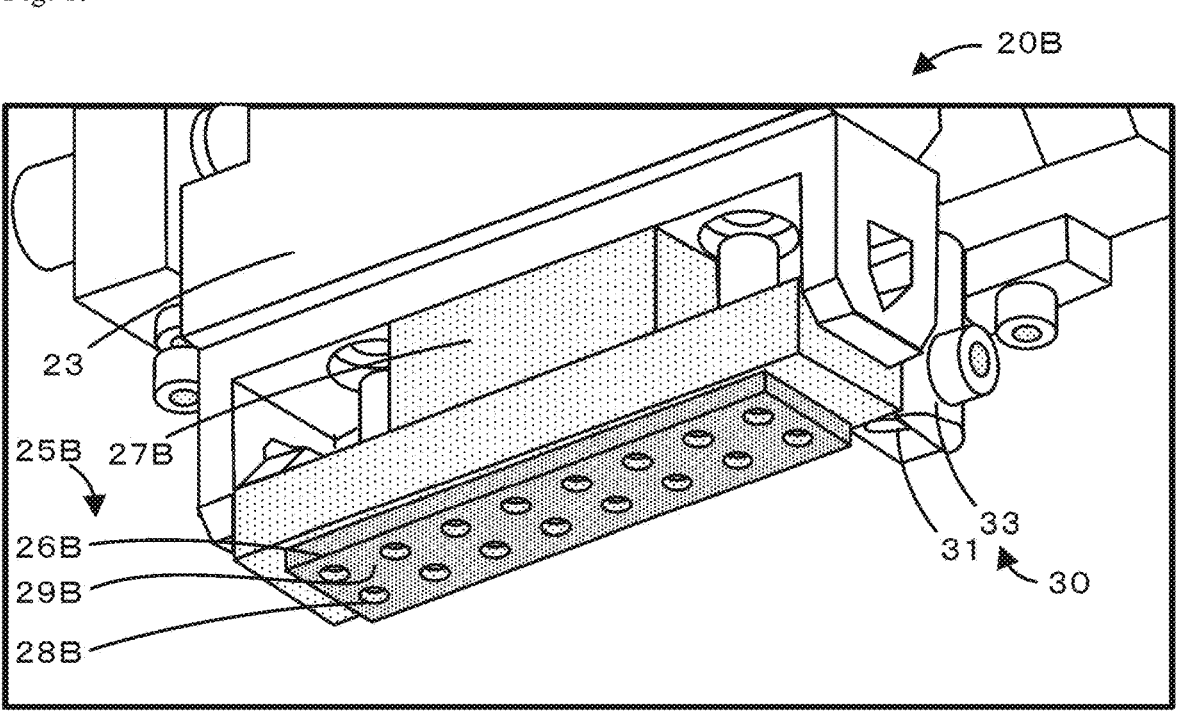
FIG. 19 is a view illustrating an example of another end effector 20B.
Figure 20:
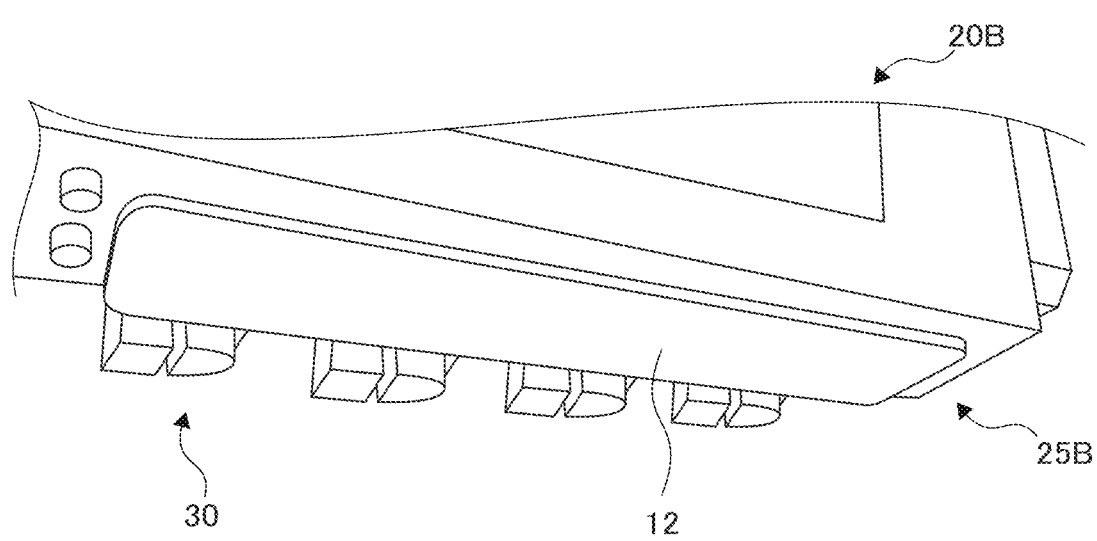
FIG. 20 is a diagram of an example in which end effector 20B holds sticker 12.

In the embodiment described above, collection member 26 is described as the pickup pad having the function of following section 27: however, the configuration is not particularly limited to this, and collection member 26 and following section 27 may be separate members. Moreover, collection member 26 is the pickup pad: however, the configuration is not particularly limited to this, collection member 26 is not limited to the pickup pad as long as it can collect sticker 12. Moreover, end effector 20 includes guide block 28 having support surface 29 over the outer periphery of collection member 26; however, the configuration is not particularly limited to this, and guide block 28 may be omitted. FIG. 19 is a view illustrating an example of another end effector 20B. FIG. 20 is a diagram of an example in which end effector 20B holds sticker 12. As illustrated in FIG. 19, end effector 20B includes collection section 25B having flat pad 26B having flexibility as collection member 26, and elastic member 27B as a following section that is disposed in support section 23 and supports flat pad 26B in a state capable of following the surface of sticker 12. Flat pad 26B has pressure supply hole 28B for supplying a negative pressure and/or a positive pressure, and support surface 29B for supporting the surface of sticker 12. Further, when support section 23 is inclined in a state where sticker 12 is stuck onto sheet 11, elastic member 27B applies a force in the peeling direction to sticker 12 while absorbing stress of the inclination, for example, may be formed of sponge, rubber, a spring, or the like. In end effector 20B, as illustrated in FIG. 20, since entire sticker 12 is supported by support surface 29, it is possible to further suppress occurrence of slack or wrinkles of sticker 12 when sticker 12 is stuck, and it is possible to stick sticker 12 with good finishing.

In the embodiment described above, peeling section 30 includes the insertion pin as peeling member 31: however, peeling section 30 is not particularly limited to this as long as it is a member that can be inserted between sheet 11 and sticker 12 and create a trigger for peeling. For example, peeling member 31 may be one or more insertion blades inserted between sheet 11 and sticker 12. The insertion blade may be a single member formed on the entire long side of sticker 12, or may be a partial member disposed in multiple cylinder sections 33. In view of adhesion of foreign matter, peeling member 31 is preferably an insertion pin.

In the embodiment described above, peeling section 30 is inserted between sheet 11 and sticker 12 in order from the end portion side toward the center side of sticker 12 (refer to FIG. 7): however, the configuration is not limited to this. For example, multiple peeling members 31 may be simultaneously inserted into the end portions of stickers 12, or may be inserted into the end portions of stickers 12 in order from the center sides of stickers 12 toward the end portion sides. Even in end effector 20, the force in the peeling direction can be applied to sticker 12 by a relatively simple process of inclining collection member 26 and inserting peeling member 31, and sticker 12 can be more reliably peeled from sheet 11. From the viewpoint of ease of peeling sticker 12, peeling member 31 is preferably inserted between sheet 11 and sticker 12 in order from the end portion side toward the center side of sticker 12.

In the embodiment described above, peeling section 30 has been described as including four cylinder sections 33 and four peeling members 31 (refer to FIG. 7); however, the configuration is not limited to this, and the number of peeling members 31 may increase or decrease as appropriate depending on the size of sticker 12 or the like. Further, in the embodiment described above, in sheet holding section 40, three holding holes 42 are disposed on the lower surface side of one sticker 12 (refer to FIG. 7): however, the configuration is not limited to this, and the number and positions of holding holes 42 may be changed as appropriate depending on the size of sticker 12 or the like.

In the embodiment described above, peeling section 30 is fixed to base portion 22 to be movable up and down by peeling drive section 32: however, the configuration is not limited to this, and peeling section 30 may be fixed while peeling drive section 32 is omitted. In this case, for example, collection section 25 side may be moved up and down. Even in end effector 20, the force in the peeling direction can be applied to sticker 12 by a relatively simple process of inclining collection member 26 and inserting peeling member 31, and sticker 12 can be more reliably peeled from sheet 11.

In the embodiment described above, end effector 20 has been described as including swinging section 24 that swings support section 23: however, the configuration is not limited to this, and swinging section 24 need not be provided in end effector 20. In this case, for example, peeling and sticking device 10 may provide arm robot 50 side with a function of swinging support section 23 as a moving section. For example, the peeling and sticking device may include a swinging section that pivotally supports the disposition section in which mounting section 51 is disposed and swings the disposition section. Specifically, end effector 20 may be swung by using connection head 52 illustrated in FIG. 1 as the disposition section. Even in this peeling and sticking device, the force in the peeling direction can be applied to sticker 12 by a relatively simple process of inclining collection member 26 and inserting peeling member 31, and sticker 12 can be more reliably peeled from sheet 11.

In the embodiment described above, end effector 20 includes pressing section 44; however, the configuration is not particularly limited to this, and end effector 20 need not include pressing section 44. In this case, peeling and sticking device 10 may be arm robot 50 provided with pressing section 44, or pressing section 44 may be omitted from peeling and sticking device 10. In addition, the pressing process may be performed using collection section 25. Even in this peeling and sticking device, the force in the peeling direction can be applied to sticker 12 by a relatively simple process of inclining collection member 26 and inserting peeling member 31, and sticker 12 can be more reliably peeled from sheet 11.

In the embodiment described above, end effector 20 includes cleaning section 46; however, the configuration is not particularly limited to this, and end effector 20 need not include cleaning section 46. In this case, peeling and sticking device 10 may include arm robot 50 provided with cleaning section 46, cleaning section 46 may be a separate device, or cleaning section 46 may be omitted from peeling and sticking device 10. Even in this peeling and sticking device, the force in the peeling direction can be applied to sticker 12 by a relatively simple process of inclining collection member 26 and inserting peeling member 31, and sticker 12 can be more reliably peeled from sheet 11.

In the embodiment described above, peeling and sticking device 10 includes sheet holding section 40 and control PC 60, but these may be provided as separate devices. In this case, a peeling and sticking system including a peeling and sticking device, a sheet holding device, and a control device may be provided.

In the embodiment described above, the direction orthogonal to the long side direction of the sticker is set as inclination direction D; however, the configuration is not particularly limited to this, and a direction deviated from the direction orthogonal to the long side direction of the sticker may be set as inclination direction D.

In the embodiment described above, after sticker 12 is peeled, sticker 12 is moved in a state where peeling member 31 is disposed below sticker 12; however, the configuration is not limited to this, and peeling member 31 may be retracted to the retracted position and sticker 12 may be moved.

In the embodiment described above, sticker 12 on sheet 11 is imaged, the position and the direction of collection member 26 are set based on the captured image, and inclination direction D and the insertion direction of peeling member 31 are set; however, the configuration is not particularly limited to this, and the imaging process and the setting process may be omitted. In order to increase the accuracy of peeling, moving, and sticking of sticker 12, it is desirable to perform imaging processing and setting processing.

In the embodiment described above, the present disclosure has been described as peeling and sticking device 10 and the peeling and sticking method, but may be described as a program for achieving the peeling and sticking method. This program causes one or multiple computers to achieve the steps of the peeling and sticking method described above. The program may be recorded on a computer-readable recording medium (for example, a hard disk, a ROM, an FD, a CD, a DVD, or the like), may be transmitted from one computer to another computer through a transmission medium (a communication network such as the Internet or a LAN), or may be transferred in any other manner.

INDUSTRIAL APPLICABILITY

The present disclosure can be used in the technical field of automatically sticking a sticker to an article.

REFERENCE SIGNS LIST

10: peeling and sticking device, 11: sheet, 12: sticker, 13: sticking target, 20, 20B: end effector, 21: connection section, 22: base portion, 23: support section, 24: swinging section, 25, 25B: collection section, 26: collection member, 26B: flat pad, 27: following section, 27B: elastic member, 28: guide block, 28B: pressure supply hole, 29, 29B: support surface, 30: peeling section, 31: peeling member, 32: peeling drive section, 33: cylinder section, 34: fixing section, 35: posture maintaining section, 36: biasing section, 37: stopper, 37*a*: fixing plate, 37*b*: fixing screw, 38: imaging section, 39: supply pipe, 40: sheet holding section, 41: placement section, 42: holding hole, 44: pressing section, 45: pressing member, 46: cleaning section, 47: cleaning hole, 50: arm robot (moving section), 51: mounting section, 52: connection head, 55: arm, 56: drive motor, 57: pedestal portion, 60: control PC, 61:

control section, 62: storage section, 64: communication section, 65: display section, 66: operation section, D: inclination direction, L: interval, x: length, y: width

The invention claimed is:

1. A peeling and sticking method executed by a peeling and sticking device including a collection member configured to collect a sticker and a peeling member configured to peel the sticker, the peeling and sticking device peeling the sticker from a sheet to which one or more stickers are stuck, the peeling and sticking method comprising:

an abutting step of lowering the collection member in a vertical direction to abut on a surface of the sticker:

an applying step of applying a force to the sticker in an inclination direction inclined with respect to the vertical direction by inclining the collection member relative to the surface of the sticker;

an inserting step of inserting the peeling member between the sticker and the sheet in an end portion of the sticker on a side opposite to the inclination direction to peel the sticker; and a moving step of moving the peeled sticker.

2. The peeling and sticking method according to claim 1, wherein in the applying step, a direction orthogonal to a longitudinal direction of the sticker is set as the inclination direction.

3. The peeling and sticking method according to claim 1, wherein in the applying step, the collection member is inclined in a range in which the collection member does not come off from the sticker.

4. The peeling and sticking method according to claim 1, wherein in the applying step, the collection member is inclined in a range of 10° or more and 45° or less with respect to the vertical direction.

5. The peeling and sticking method according to claim 1, wherein in the inserting step, the peeling member is inserted between the sheet and the sticker in order from an end portion side toward a center side of the sticker.

6. The peeling and sticking method according to claim 1, wherein in the moving step, the sticker is moved in a state where the peeling member is disposed below the sticker after the sticker is peeled.

7. The peeling and sticking method according to claim 6, wherein in the moving step, the sticker held by the collection member is stuck at a sticking position in a state where the peeling member is retracted from below the peeled sticker.

8. The peeling and sticking method according to claim 1, wherein in the moving step, a pressing process is performed by a pressing member after the peeled sticker is stuck at a sticking position.

9. A peeling and sticking method executed by a peeling and sticking device including a collection member configured to collect a sticker and a peeling member configured to peel the sticker, the peeling and sticking device peeling the sticker from a sheet to which one or more stickers are stuck, the peeling and sticking method comprising:

an applying step of applying a force to the sticker in an inclination direction inclined with respect to a vertical direction of a surface of the sticker by causing the collection member configured to collect the sticker to abut on the surface of the sticker;

an inserting step of inserting the peeling member between the sticker and the sheet in an end portion of the sticker on a side opposite to the inclination direction to peel the sticker;

a moving step of moving the peeled sticker;

an imaging step of imaging the sticker on the sheet; and a setting step of setting a position and a direction of the collection member and setting a direction in which the collection member is inclined with respect to the vertical direction and an insertion direction of the peeling member based on a captured image obtained in the imaging step, wherein the applying step and the inserting step are executed based on the set content set in the setting step.

10. A peeling and sticking method executed by a peeling and sticking device including a collection member configured to collect a sticker and a peeling member configured to peel the sticker, the peeling and sticking device peeling the sticker from a sheet to which one or more stickers are stuck, the peeling and sticking method comprising:

an applying step of applying a force to the sticker in an inclination direction inclined with respect to a vertical direction of a surface of the sticker by causing the collection member configured to collect the sticker to abut on the surface of the sticker;

an inserting step of inserting the peeling member between the sticker and the sheet in an end portion of the sticker on a side opposite to the inclination direction to peel the sticker; and a moving step of moving the peeled sticker, wherein the peeling and sticking device includes a support section configured to support the collection member and incline the collection member with respect to a vertical direction of the sticker, a following section configured to cause the collection member to follow the surface of the sticker when the support section is inclined, and a swinging section configured to pivotally support the support section and swing the support section, in the applying step, after the collection member abuts on the sticker, the swinging section is moved in a direction in which the support section is inclined, the support section is inclined by the swinging section and the following section, and a force in a peeling direction is applied to the sticker via the collection member, and in the inserting step, the peeling member is inserted between the sticker and the sheet in a state in which the force in the peeling direction is applied to the sticker, and the sticker is peeled from the sheet.

11. A non-transitory storage medium storing a program for causing one or multiple computers to execute the steps of the peeling and sticking method according to claim 1.

* * * * *